(12) United States Patent
Nien et al.

(10) Patent No.: US 9,949,310 B2
(45) Date of Patent: *Apr. 17, 2018

(54) APPARATUSES AND METHODS FOR COORDINATING OPERATIONS BETWEEN CIRCUIT SWITCHED (CS) AND PACKET SWITCHED (PS) SERVICES WITH DIFFERENT SUBSCRIBER IDENTITY CARDS, AND MACHINE-READABLE STORAGE MEDIUM

(71) Applicant: MediaTek Inc., Hsin-Chu (TW)

(72) Inventors: Yu-Tsun Nien, Taipei (TW); Chin-Han Wang, Taipei (TW); Chen-Hsuan Lee, Taipei (TW); Sian-Jheng Wong, Yizhu Township, Chiayi County (TW); Chang-Ching Yan, Pingtung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,996

(22) Filed: Dec. 21, 2016

(65) Prior Publication Data

US 2017/0105241 A1 Apr. 13, 2017

Related U.S. Application Data

(63) Continuation of application No. 12/909,234, filed on Oct. 21, 2010, now Pat. No. 9,565,715.

(Continued)

(51) Int. Cl.
*H04W 76/02* (2009.01)
*H04B 1/3816* (2015.01)
(Continued)

(52) U.S. Cl.
CPC ........ *H04W 76/025* (2013.01); *H04B 1/3816* (2013.01); *H04L 69/18* (2013.01); *H04W 76/028* (2013.01); *H04W 76/064* (2013.01)

(58) Field of Classification Search
None
See application file for complete search history.

(56) References Cited

U.S. PATENT DOCUMENTS

| 5,745,695 A | 4/1998 | Gilchrist et al. |
| 7,116,646 B1 | 10/2006 | Gustafson et al. |

(Continued)

FOREIGN PATENT DOCUMENTS

| CN | 1428064 | 7/2003 |
| CN | 1816187 | 8/2006 |

(Continued)

*Primary Examiner* — Yemane Mesfin
*Assistant Examiner* — Jeff Banthrongsack
(74) *Attorney, Agent, or Firm* — McClure, Qualey & Rodack, LLP

(57) ABSTRACT

A wireless communications device includes a radio frequency (RF) module and a baseband chip. The baseband chip is configured to initiate a mobile originated (MO) call through the RF module with a first subscriber identity card when the RF module is occupied by performing a packet switched (PS) data service with a second subscriber identity card, arbitrate a first protocol stack handler to suspend or terminate the PS data service associated with the second subscriber identity card in response to initiating the MO call associated with the first subscriber identity card, and arbitrate a second protocol stack handler to make the MO call associated with the first subscriber identity card when the PS data service associated with the second subscriber identity card is suspended or terminated.

20 Claims, 18 Drawing Sheets

Related U.S. Application Data

(60) Provisional application No. 61/334,198, filed on May 13, 2010.

(51) Int. Cl.
*H04W 76/06* (2009.01)
*H04L 29/06* (2006.01)

(56) References Cited

U.S. PATENT DOCUMENTS

| | | |
|---|---|---|
| 7,809,387 B2 | 10/2010 | Chaudry et al. |
| 7,912,497 B2 | 3/2011 | Isidore et al. |
| 2002/0085516 A1 | 7/2002 | Bridgelall |
| 2005/0220079 A1 | 10/2005 | Asokan |
| 2006/0234693 A1 | 10/2006 | Isidore et al. |
| 2007/0149191 A1* | 6/2007 | Wu .................. H04W 48/16 455/434 |
| 2010/0003983 A1 | 1/2010 | Gallagher et al. |
| 2010/0074181 A1 | 3/2010 | Markovic et al. |
| 2010/0099454 A1 | 4/2010 | Reddy |
| 2010/0159874 A1 | 6/2010 | Lewis et al. |
| 2010/0248782 A1* | 9/2010 | Cheon .................. H04M 1/22 455/558 |
| 2011/0103305 A1* | 5/2011 | Ali .................... H04W 76/062 370/328 |
| 2014/0112207 A1 | 4/2014 | Hinrikus et al. |

FOREIGN PATENT DOCUMENTS

| | | |
|---|---|---|
| CN | 101217738 | 7/2008 |
| CN | 101272573 | 9/2008 |
| CN | 101442652 | 5/2009 |
| CN | 101523860 | 9/2009 |
| GB | 2 381 418 | 4/2003 |
| WO | WO 01/67794 | 9/2001 |
| WO | WO 2008/025987 | 3/2008 |
| WO | WO 2009/006904 | 1/2009 |

* cited by examiner

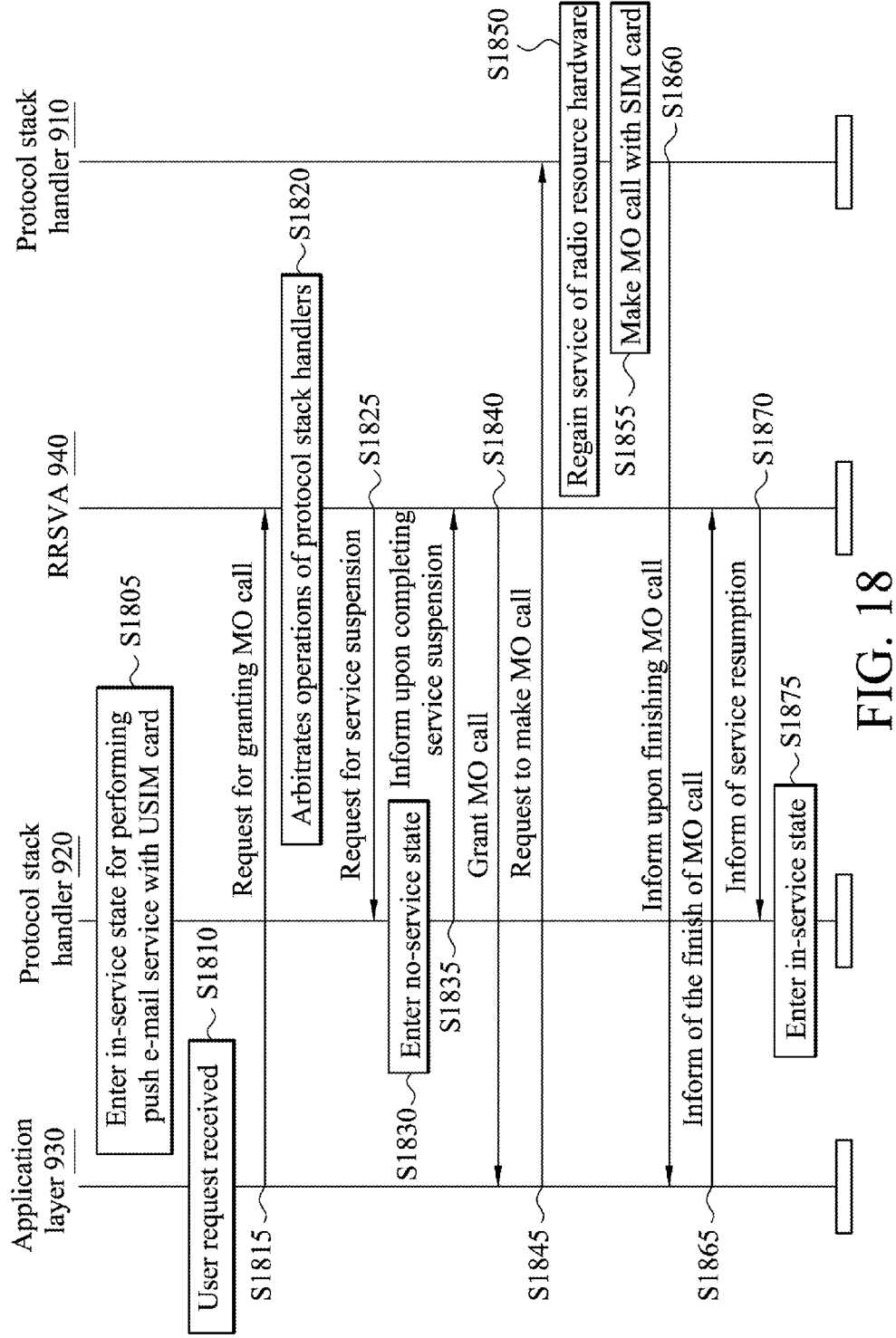

APPARATUSES AND METHODS FOR COORDINATING OPERATIONS BETWEEN CIRCUIT SWITCHED (CS) AND PACKET SWITCHED (PS) SERVICES WITH DIFFERENT SUBSCRIBER IDENTITY CARDS, AND MACHINE-READABLE STORAGE MEDIUM

CROSS REFERENCE TO RELATED APPLICATIONS

This application is a Continuation of pending U.S. patent application Ser. No. 12/909,234, filed on Oct. 21, 2010, now U.S. Pat. No. 9,565,715, which claims the benefit of U.S. Provisional Application No. 61/334,198, filed on May 13, 2010, the entirety of which is incorporated by reference herein.

BACKGROUND OF THE INVENTION

Field of the Invention

The invention generally relates to the coordination of operations between communication services, and more particularly, to the coordination of the operations between CS and PS services with different subscriber identity cards.

Description of the Related Art

With growing demand for ubiquitous computing and networking, various wireless communication technologies have been developed, such as the Global System for Mobile communications (GSM) technology, General Packet Radio Service (GPRS) technology, Enhanced Data rates for Global Evolution (EDGE) technology, Wideband Code Division Multiple Access (W-CDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and others. Generally, a cellular phone only supports one wireless communication technology and provides the user the flexibility of mobile communications at all times via the supported wireless communication technology, regardless of his/her geographic location. Especially in today's business world, a cellular phone is becoming a necessary business tool for conducting business conveniently. For business people, having an additional cellular phone exclusive for business matters is a common choice, since they need to conduct business while out of the office or even out of the city/country. Others may find having an additional cellular phone is a good way to save/control the budget for wireless service charges (including phone services and/or data services). However, having two or more than two cellular phones may be troublesome when one has to switch frequently between the cellular phones and carry around all the cellular phones with himself/herself. In order to provide a convenient way of having multiple subscriber numbers, dual-card cellular phones have been developed, which generally have two wireless communications modules for respectively performing wireless transmission and reception with an individual subscriber number. The dual-card design allows both wireless communications modules to be active simultaneously and allows calls to be received on either subscriber numbers associated with one of the wireless communications modules at any time. Thus, a dual-card cellular phone may be used for business and personal use with separate subscriber numbers and bills, or for travel with the second subscriber number for the country visited.

For the dual-card cellular phones with one single transceiver, only one wireless communications module is allowed to obtain network resources using the single transceiver, while the other wireless communications module has no control over the single transceiver. Specially, the wireless communications module with no control over the single transceiver is not aware that the single transceiver is occupied by the other wireless communications module, because the two wireless communications modules operate independently and lack a proper communication mechanism therebetween. For example, a dual-card cellular phone may be configured such that the single transceiver is occupied by the first wireless communications module for performing a data service, e.g. the Multimedia Messaging Service (MMS). When a Mobile Originated (MO) call for the second wireless communications module is requested by a user, an error message, such as "Network Failed", may be shown on the screen of the dual-card cellular phone since the second wireless communications module has no access to the single transceiver, nor has shown information about the statuses of the first wireless communications module and the single transceiver.

Therefore, it is desirable to have a flexible way of managing the operations between the multiple wireless communications modules for multiple subscriber identity cards, so that the operations of the multiple wireless communications modules may be coordinated to respond to users' MO requests.

BRIEF SUMMARY OF THE INVENTION

Accordingly, embodiments of the invention provide apparatuses and methods for coordinating the operations between CS and PS services with a respective subscriber identity card. In one aspect of the invention, a wireless communications device includes a radio frequency (RF) module and a baseband chip. The baseband chip is configured to initiate a mobile originated (MO) call through the RF module with a first subscriber identity card when the RF module is occupied by performing a packet switched (PS) data service with a second subscriber identity card, arbitrate a first protocol stack handler to suspend or terminate the PS data service associated with the second subscriber identity card in response to initiating the MO call associated with the first subscriber identity card, and arbitrate a second protocol stack handler to make the MO call associated with the first subscriber identity card when the PS data service associated with the second subscriber identity card is suspended or terminated.

In another aspect of the invention, a method coordinates operations between circuit switched (CS) and packet switched (PS) services with different subscriber identity cards in a wireless communications device. The method comprises initiating a Mobile Originated (MO) call through a RF module from the wireless communications device with a first subscriber identity card when the RF module is occupied by performing a PS data service with a second subscriber identity card; determining whether the MO call has a higher priority than the PS data service; arbitrating a first protocol stack handler to suspend or terminate the PS data service associated with the second subscriber identity card in response to initiating the MO call associated with the first subscriber identity card when the MO call has a higher priority than the PS data service; and arbitrating a second protocol stack handler to make the MO call associated with the first subscriber identity card when the PS data service associated with the second subscriber identity card is suspended or terminated.

In another aspect of the invention, a wireless communications device comprises a radio frequency (RF) module and a baseband chip. The baseband chip is configured to initiate a mobile originated (MO) call through the RF module from the wireless communications device with a first subscriber identity card when the RF module is occupied by performing a packet switched (PS) data service with a second subscriber identity card, redirect the MO call to the second subscriber identity card, and make the MO call with the second subscriber identity card. The baseband chip further determines whether the MO call has a higher priority than the PS data service and the redirection of the MO call to the second subscriber identity card is performed when the MO call has a higher priority than the PS data service.

Other aspects and features of the present invention will become apparent to those with ordinarily skill in the art upon review of the following descriptions of specific embodiments of the apparatuses and methods for coordinating the operations between CS and PS services with a respective subscriber identity card, and the machine-readable storage medium for storing program code which performs the methods when executed.

BRIEF DESCRIPTION OF DRAWINGS

The invention can be more fully understood by reading the subsequent detailed description and examples with references made to the accompanying drawings, wherein:

FIG. 18 is a message sequence chart illustrating the coordination of the operations between the protocol handlers 910 and 920 according to the embodiment of FIG. 17.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
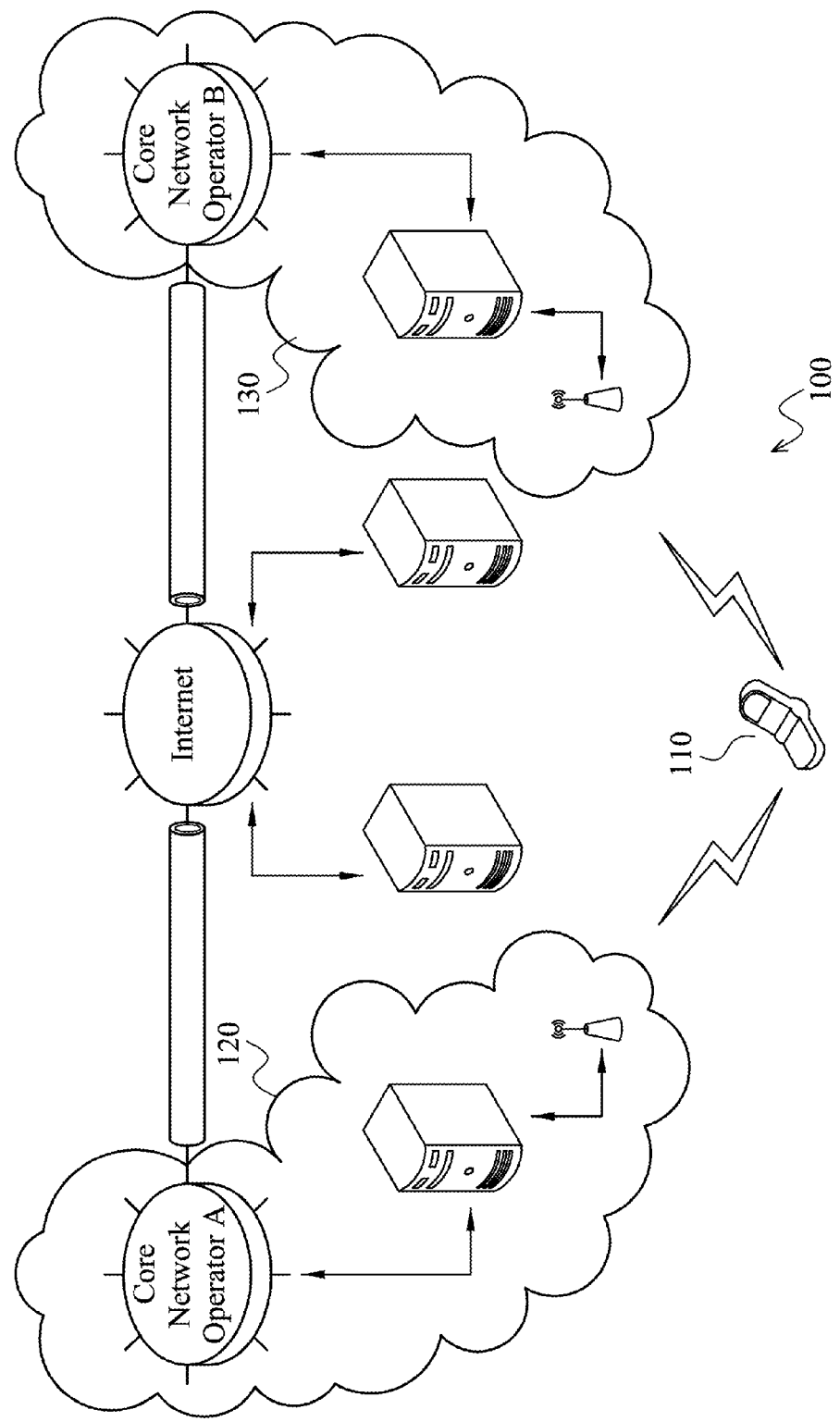
FIG. 1 is a block diagram of a wireless communications environment according to an embodiment of the invention.

FIG. 1 is a block diagram of a wireless communications environment according to an embodiment of the invention. The wireless communications environment 100 comprises a mobile station (MS) 110, service networks 120 and 130. The MS 110 may wirelessly communicate with the service networks 120 and 130 with two separate subscriber numbers, after camping on two cells. The cell may be may be managed by a node-B, a base station (BS), an advanced BS (ABS), an enhanced BS (EBS) or others. However, the communication is only allowed to be performed with either one of the service networks 120 and 130 at a given time. The service networks 120 and 130 may be in compliance with any two of the GSM/GPRS/EDGE, WCDMA, CDMA 2000, TD-SCDMA, WiMAX, LTE, and TD-LTE technologies. The subscriber numbers may be provided by two separate subscriber identity cards in compliance with the specifications of the technologies employed by the service networks 120 and 130. For example, the service network 120 may be a GSM/GPRS/EDGE system, and correspondingly, one of the subscriber identity cards may be a Subscriber Identity Module (SIM) card, while the service network 130 may be a WCDMA, LTE, or TD-LTE system and correspondingly, the other one of the subscriber identity cards may be a Universal SIM (USIM) card. Alternatively, the service network 120 may be a CDMA 2000 system and correspondingly, one of the subscriber identity cards may be a Removable User Identity Module (R-UIM) card, while the service network 130 may be a TD-SCDMA system and correspondingly, the other one of the subscriber identity cards may be a CDMA subscriber Identity Module (CSIM) card.

The MS 110 wirelessly access Internet resources, such as e-mail transmission, Web browsing, file upload/download, instant messaging, streaming video, voice over IP (VOIP) or others, or making a wireless phone call. In addition, a computer host or a notebook may connect/couple to the MS 110 and wirelessly access Internet resources therethrough.

The MS 110 may be operated in idle mode or dedicated mode, in GSM systems, for the inserted SIM card. In idle mode, the MS searches for or measures the Broadcast Control Channel (BCCH) with better signal quality from a cell provided by a specific service network, or is synchronized to the BCCH of a specific cell and ready to perform a random access procedure on the Random Access Channel (RACH) for requesting a dedicated channel. In dedicated mode, the MS 110 occupies a physical channel and tries to synchronize therewith, and establishes logical channels and switches them through. Similarly, as the MS 110 equipped with one or more USIM cards, the MS 110 may be operated in idle mode and connected mode, in the WCDMA or TD-SCDMA network, for each inserted USIM card.

Figure 2:
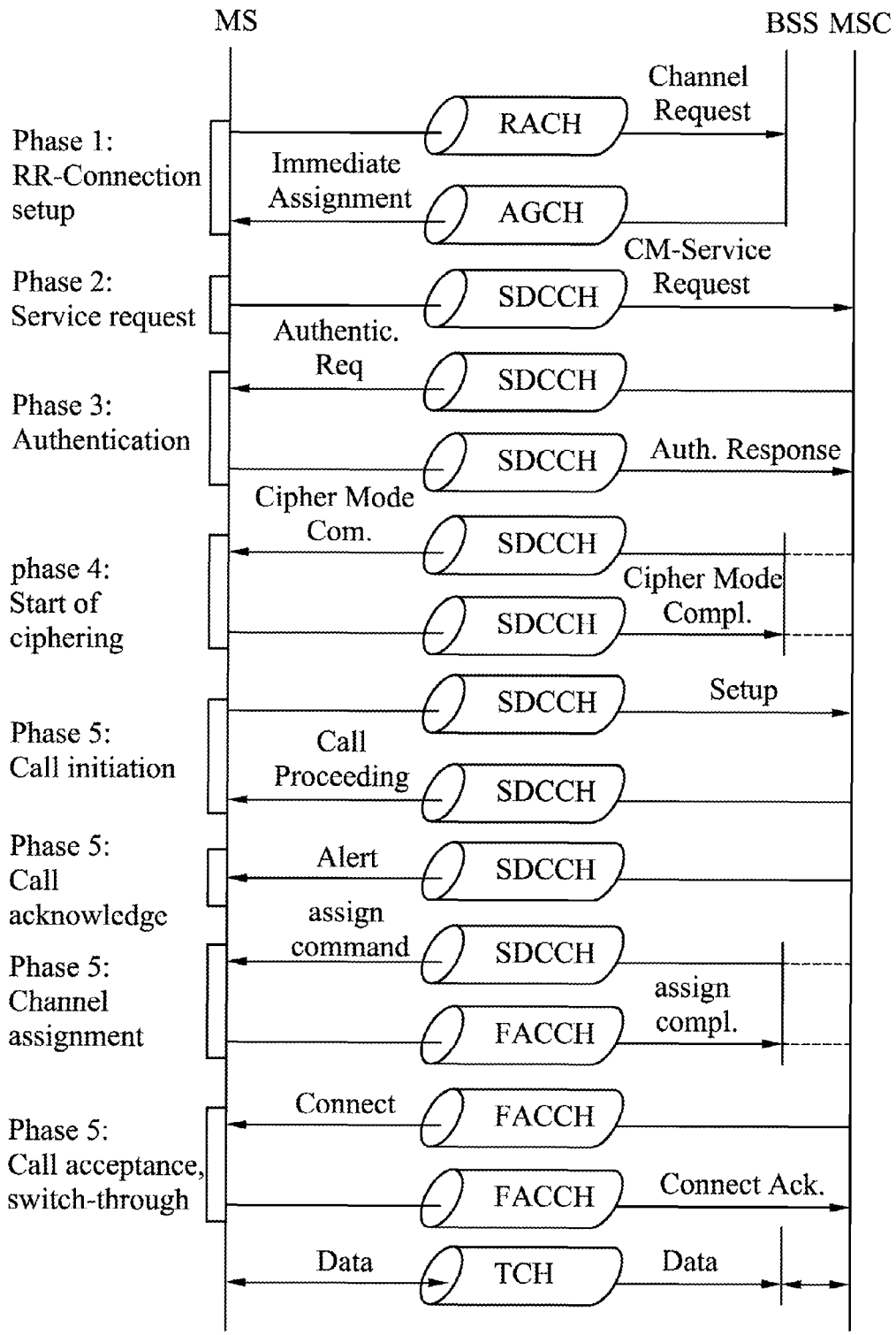
FIG. 2 shows an exemplary Call Control (CC) in a GSM system.

Taking a GSM system for example, referring to FIG. 2, Call Control (CC) comprising procedures to establish, control, and terminate calls is one of the entities of Connection Management (CM). If there is an attempt to make a call from an MS, i.e. Mobile Originated (MO) call, the CC entity first requests a Mobility Management (MM) connection from the local MM entity. For a simple call, the MS have to be registered with the GSM service network, whereas the registration is only optionally required with an emergency call. That is, an emergency call is also established on an unenciphered Radio Resource (RR) connection from an unregistered MS. After successful establishment of this MM connection and activation of the user data encryption, the service-requesting CC entity is informed. The MS signals on this connection the attempt to connect to the CC entity in the Mobile Switching Center MSC (SETUP). The MSC may respond to this connection request in several ways. The Network Control and Management (MSC) may indicate with a CALL PROCEEDING message that the call request has been accepted and that all the necessary information for the setup of the call is available. Otherwise, the call request may be declined with a RELEASE COMPLETE message. As soon as the called party accepts the call request (i.e. the corresponding node of the MS or a wired telephone), the MS receives an ALERTING message. Also, once the called party accepts the call, a CONNECT message which is acknowledged with a CONNECT ACKNOWLEDGE message is returned, and thus, switching through the call and the associated user data connection. In addition, CC in GSM systems has a number of peculiarities, especially to account for the limited resources and properties of the radio channel. In particular, the call request of the MS may be entered into a queue (call queuing), if there is no immediately free Traffic Channel (TCH) for the establishment of the call. The maximum waiting time a call may have to wait for assignment of a TCH can be adjusted according to operator requirements. Furthermore, the point at which the TCH is actually assigned is chosen. For example, the TCH can be assigned immediately after acknowledging the call request (CALL PROCEEDING message), also referred to as early assignment. On the other hand, the call may be first processed completely and the assignment occurs only after the targeted subscriber is being called, also referred to as late assignment or Off-Air Call Setup (OACSU). The OACSU may avoid unnecessary allocation of TCH if the called party is not available. Also, there is a probability that after a successful call request signaling procedure, no TCH may be allocated for the calling party before the called party accepts the call; and thus, the call cannot be completely switched through and have to be broken off. CC of WCDMA or TD-SCDMA systems is similar to that of the GSM systems and is omitted herein for brevity.

MO short message service (SMS) messages are transported from an MS to a Short Message Service Centre (SMSC), and may be destined to mobile users, subscribers on a fixed network, or Value-Added Service Providers (VASPs), also known as application-terminated. Mobile-terminated (MT) SMS messages are transported from the SMSC to the destination MS. In a GSM system, a completely established MM connection is required for the transport of SMS messages, which again presumes an existing RR connection with LAPDm protection on an SDCCH or SACCH. An SMS transport Protocol Data Unit (PDU) is transmitted with an RP-DATA message between MSC and MS using the Short Message Relay Protocol (SM-RP). Correct reception is acknowledged with an RP-ACK message either from the SMS service center (mobile-originated SMS transfer). In WCDMA or TD-SCDMA systems, before transport of SMS messages, a Radio Resource Control (RRC) connection has to be successfully established.

Figure 3:
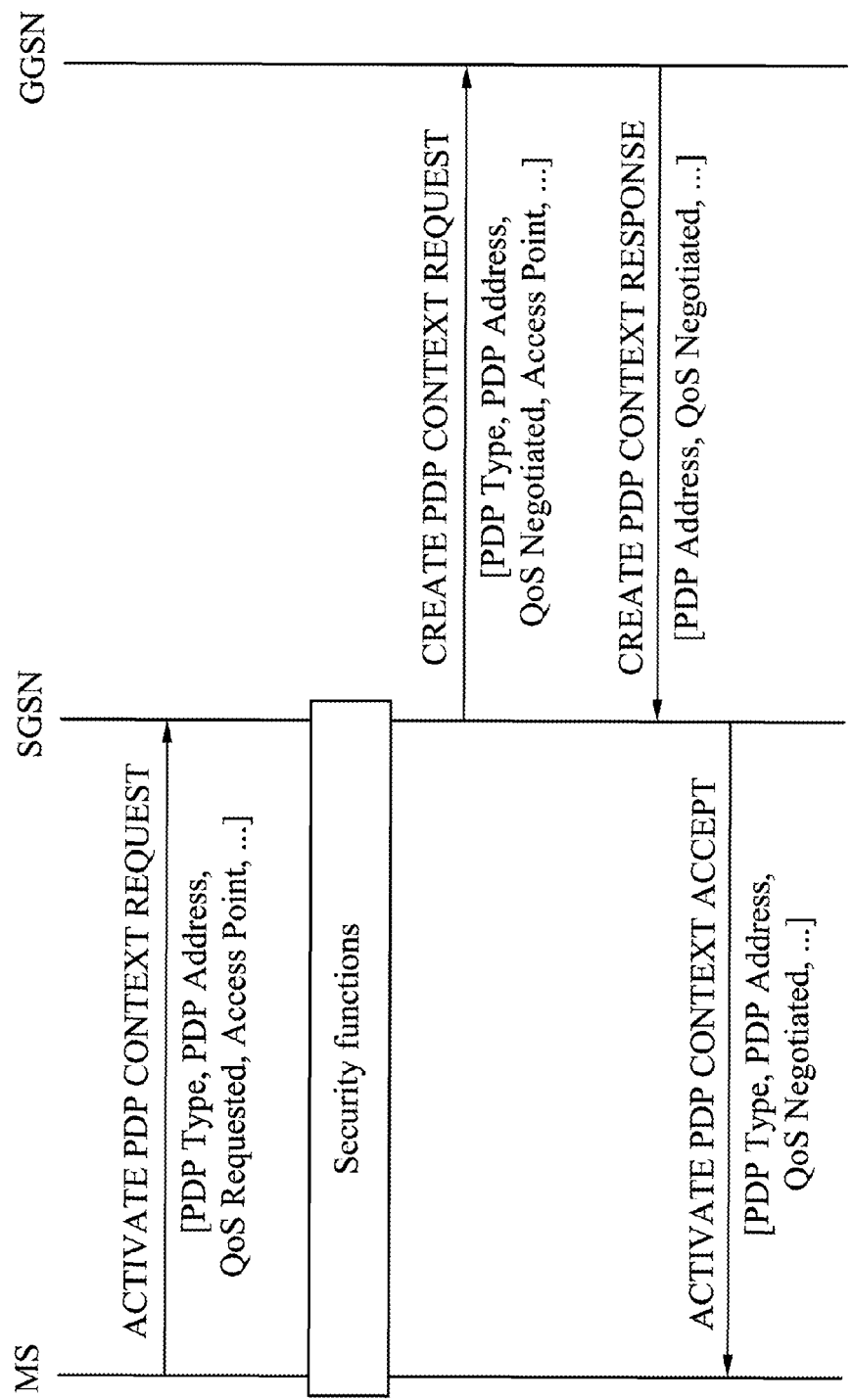
FIG. 3 shows a PDP context activation procedure initialized by an MS in a GPRS system.

For the GPRS systems, networks based on the Internet Protocol (IP) (e.g. the global Internet or private/corporate intranets) and X.25 networks are supported. Before one of (U)SIM cards of an MS can use the GPRS service, the MS needs to perform a GPRS attach procedure to attach to the GPRS network with one (U)SIM card. In the GPRS attach procedure, the MS first sends an ATTACH REQUEST message to a Serving GPRS Support Node (SGSN). The GPRS network then checks if the MS is authorized, copies the user profile from the Home Location Register (HLR) to the SGSN, and assigns a Packet Temporary Mobile Subscriber Identity (P-TMSI) to the MS. To exchange data packets with external Public Data Networks (PDNs) after a successful GPRS attach procedure, the MS applies for an address used in the PDN, wherein the address is called a Packet Data Protocol (PDP) address. In the case where the PDN is an IP network, the PDP address is an IP address. For each session, a so-called PDP context is created, which describes the characteristics of the session. The PDP context describes PDP type (e.g. IPv4, IPv6 or others), the PDP address assigned to the MS, the requested Quality of Service (QoS) class and the address of a Gateway GPRS Support Node (GGSN) that serves as the access point to the external network. FIG. 3 shows the PDP context activation procedure initialized by an MS. With the ACTIVATE PDP CONTEXT REQUEST message, the MS informs the SGSN of the requested PDP context. After that, the typical GSM security functions (e.g. authentication of the MS) are performed. If the access is granted, the SGSN will send a CREATE PDP CONTEXT REQUEST message to the affected GGSN. The GGSN creates a new entry in its PDP context table, which enables the GGSN to route data packets between the SGSN and the external PDN. The GGSN confirms the request to the SGSN with a CREATE PDP CONTEXT RESPONSE message. Finally, the SGSN updates its PDP context table and confirms the activation of the new PDP context to the MS with an ACTIVATE PDP CONTEXT ACCEPT message. Note that for an MS using both CS and PS services, it is possible to perform a combined GPRS/IMSI attach procedure. The disconnection from the GPRS network is called GPRS detachment, which may be initiated by the MS or by the GPRS network.

In addition, IP packets are transmitted encapsulated within the GPRS backbone network. The transmission is achieved using the GPRS Tunneling Protocol (GTP), that is, GTP packets carry the user's IP packets. The GTP is defined both between GPRS Supports Nodes (GSNs) within the same PLMN and between GSNs of different PLMNs. It contains procedures in the transmission plane as well as in the signaling plane. In the transmission plane, the GTP employs a tunnel mechanism to transfer user data packets. In the signaling plane, the GTP specifies a tunnel control and management protocol. The signaling is used to create, modify, and delete tunnels. A Tunnel Identifier (TID), which is composed of the IMSI of the (U)SIM card and a Network Layer Service Access Point Identifier (NSAPI) uniquely indicates a PDP context. Below the GTP, a transmission control protocol (TCP) is employed to transport the GTP packets within the backbone network. In the network layer, IP is employed to route the packets through the backbone. Taking the GSM systems for example, after the MS successfully attaches to a GPRS network with a (U)SIM card, a cell supporting GPRS may allocate physical channels for GPRS traffic. In other words, the radio resources of a cell are shared by the MS with the (U)SIM card.

Figure 4:
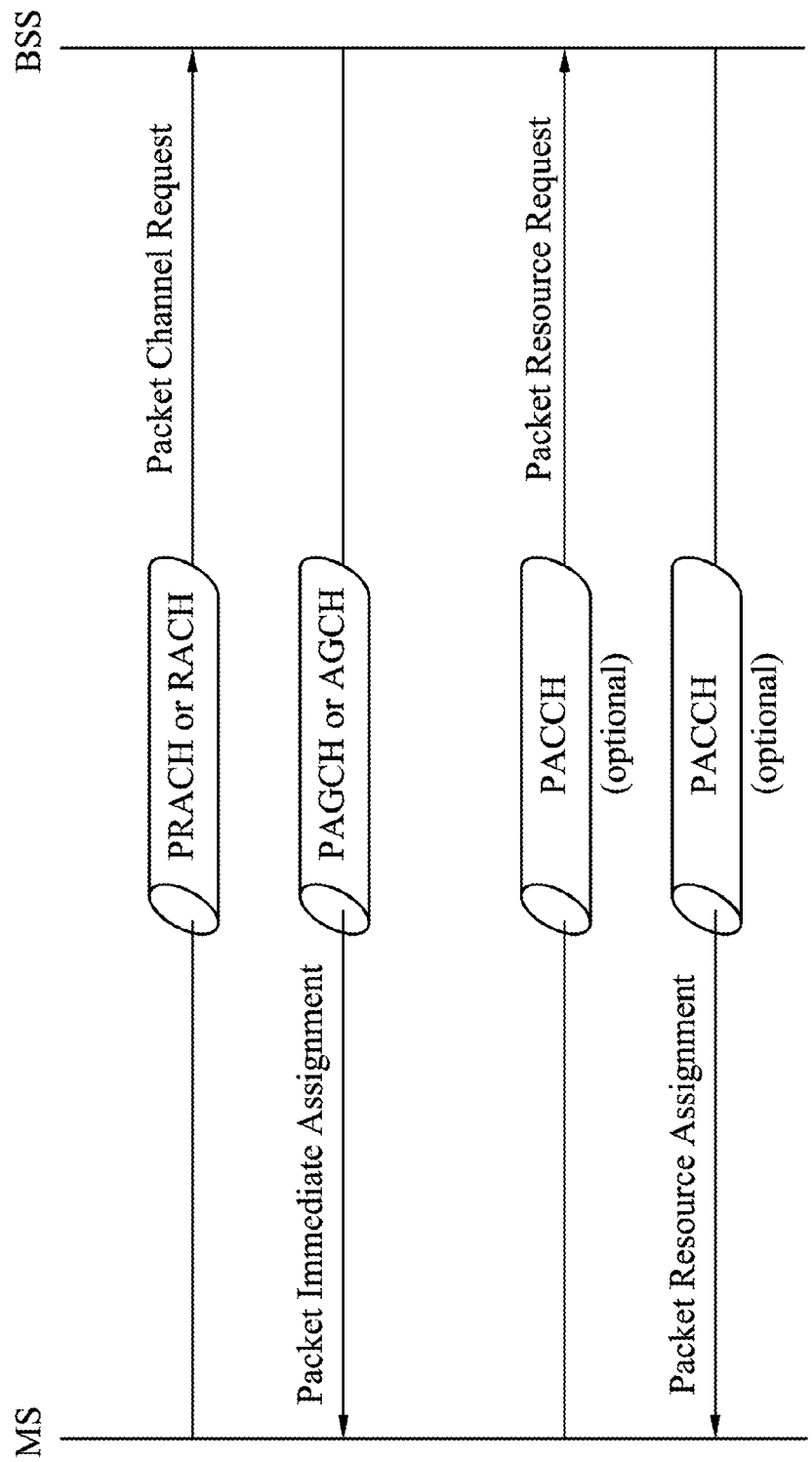
FIG. 4 shows an exemplary uplink channel allocation in a GPRS system.

FIG. 4 shows an exemplary uplink channel allocation (mobile originated packet transfer). The attached SIM card of the MS requests a channel by sending a PACKET CHANNEL REQUEST message on the Packet Random Access Channel (PRACH) or RACH. The BSS answers on the Packet Access Grant Channel (PAGCH) or AGCH. Once the PACKET CHANNEL REQUEST message is successfully sent, a so-called Temporary Block Flow (TBF) is established. With the TBF, resources (e.g. Packet Data Traffic Channel (PDTCH) and buffers) are allocated for the attached (U)SIM card of the MS, and data transmission can start. During transfer, the Uplink State Flag (USF) in the header of downlink blocks indicates to other MSs that this uplink PDTCH is already in use. On the receiver side, a Temporary Flow Identifier (TFI) facilitates to reassemble the packet. Once all data has been transmitted, the TBF and the resources are released.

Figure 5:
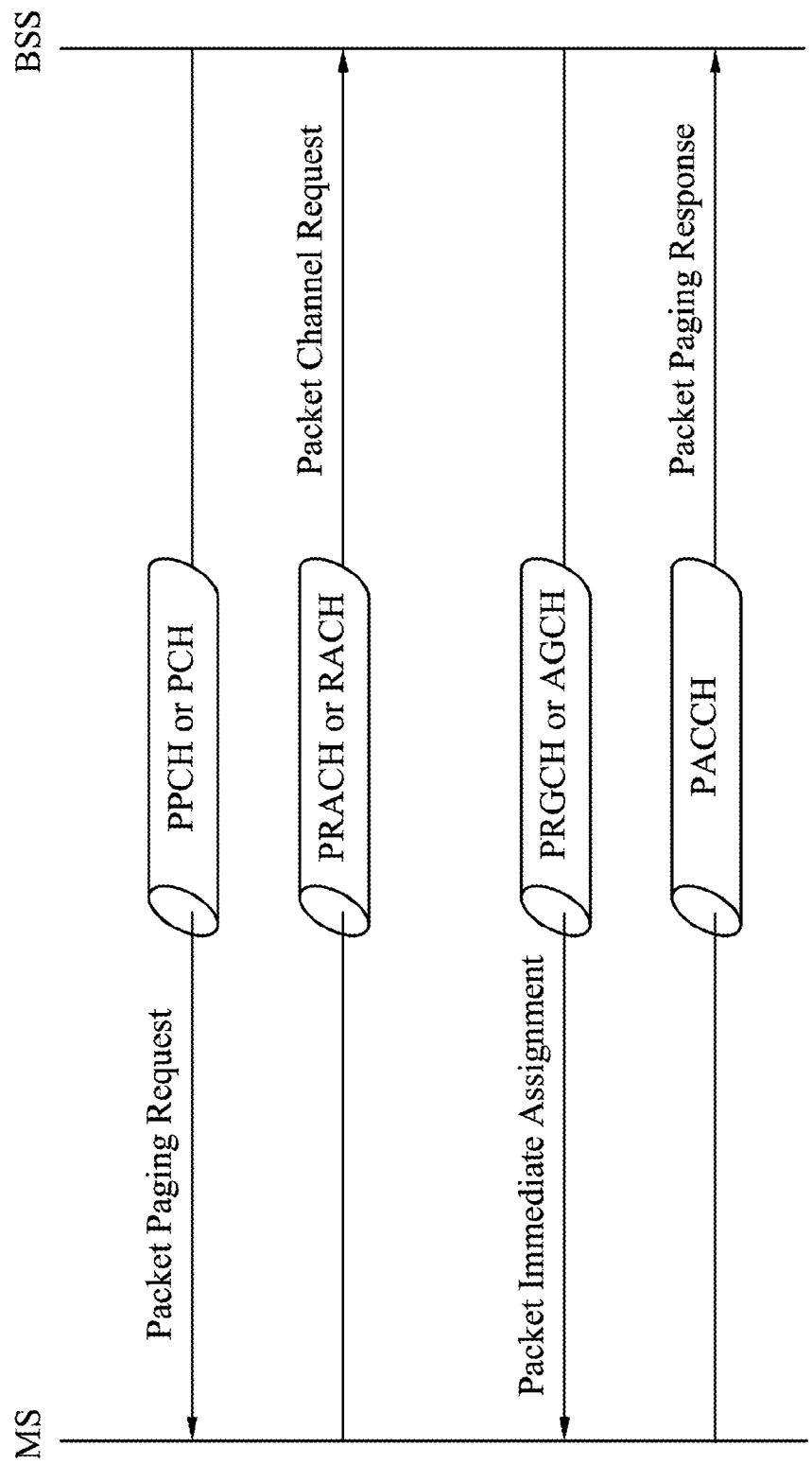
FIG. 5 shows an exemplary paging procedure of a SIM card of an MS in a GPRS system.

FIG. 5 shows an exemplary paging procedure of a SIM card of a MS (mobile terminated packet transfer). The BSS pages the attached SIM card of the MS by sending a PACKET PAGING REQUEST message on the Packet Paging Channel (PPCH) or PCH. Correspondingly, the attached SIM card of the MS answers on the Packet Random Access Channel (PRACH) or RACH.

Figure 6:
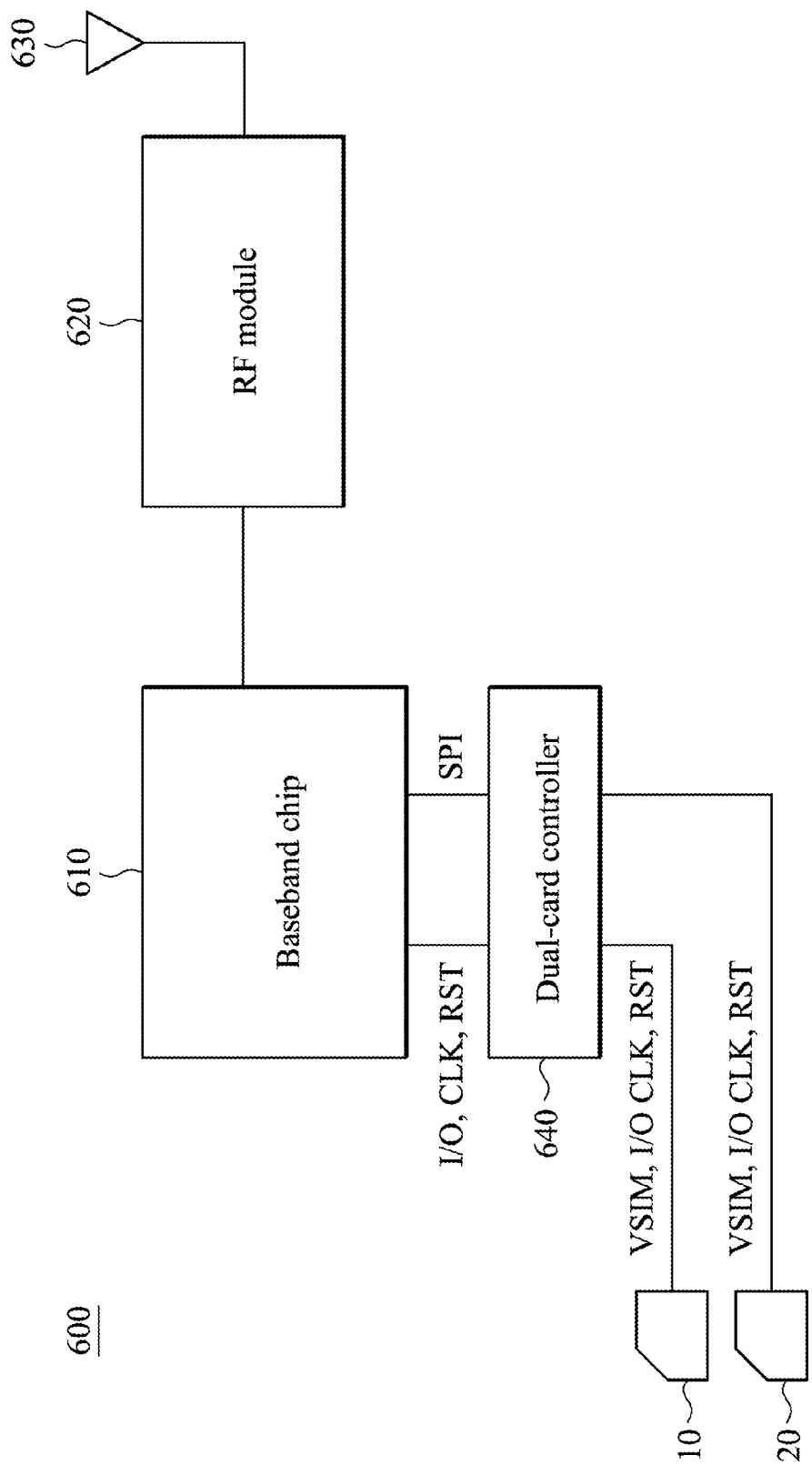
FIG. 6 is a block diagram illustrating the hardware architecture of an MS according to an embodiment of the invention.
Figure 7:
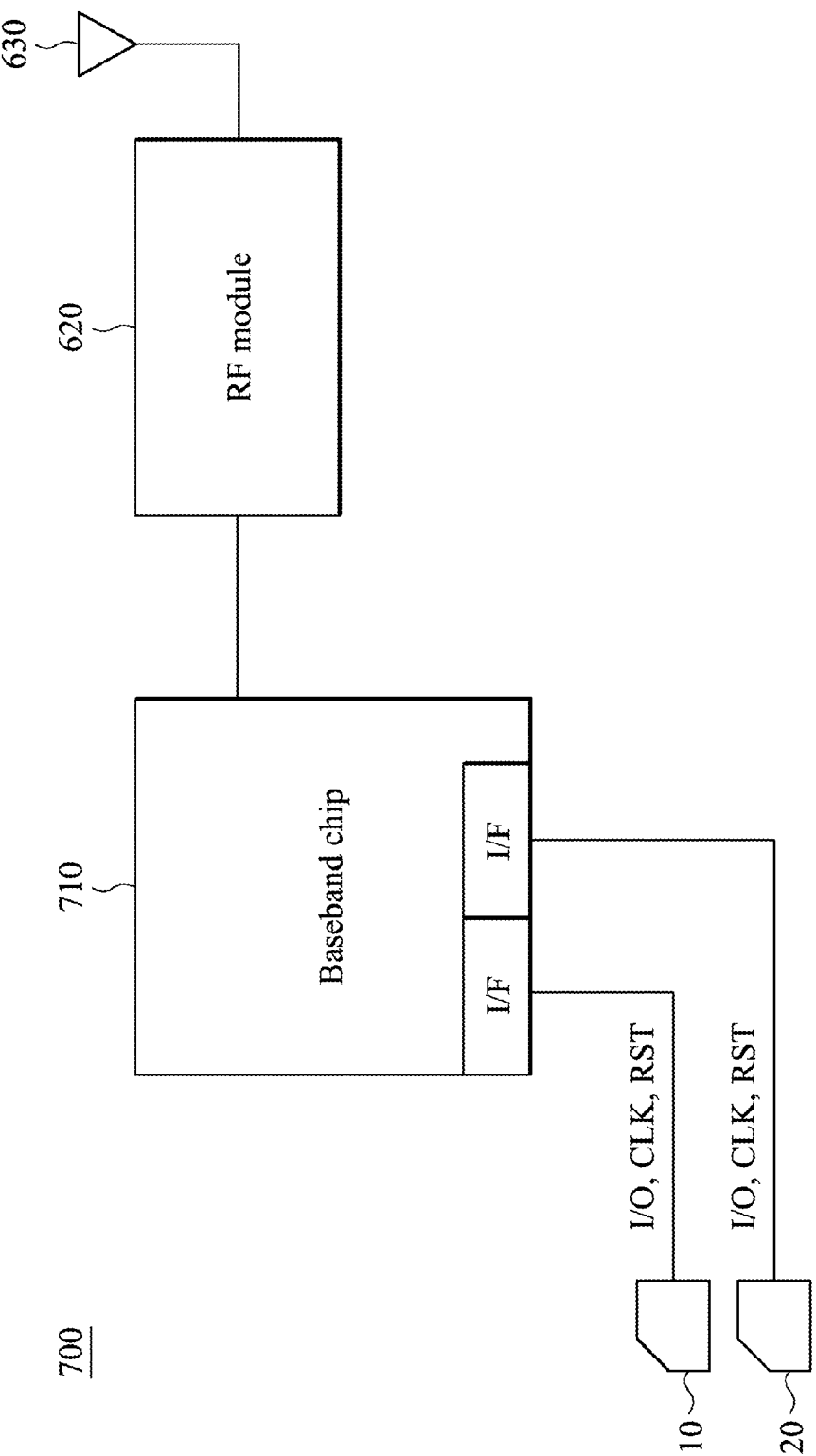
FIG. 7 is a block diagram illustrating the hardware architecture of an MS according to another embodiment of the invention.

FIG. 6 is a block diagram illustrating the hardware architecture of an MS according to an embodiment of the invention. The MS 600 is equipped with a Baseband chip 610, and a single RF module 620 coupled with an antenna 630. The Baseband chip 610 may contain multiple hardware devices to perform baseband signal processing, including analog to digital conversion (ADC)/digital to analog conversion (DAC), gain adjusting, modulation/demodulation, encoding/decoding, and so on. The RF module 220 may receive RF wireless signals from the antenna 630, convert the received RF wireless signals to baseband signals, which are then processed by the Baseband chip 610, or receive baseband signals from the Baseband chip 610 and convert the received baseband signals to RF wireless signals, which are later transmitted via the antenna 630. The RF module 220 may also contain multiple hardware devices to perform radio frequency conversion. For example, the RF module 220 may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in WCDMA systems, or others depending on the radio access technology (RAT) in use. As shown in FIG. 2, the subscriber identity cards 10 and 20 are plugged into two sockets of the MS 110. The MS 110 may further comprise a dual-card controller 640 coupled or connected between the Baseband chip 610 and the subscriber identity cards 10 and 20. The dual-card controller 640 powers the subscriber identity cards 10 and 20 with the same or different voltage levels according to requirements thereof by a power management integrated chip (PMIC) and a battery, wherein the voltage level for each subscriber identity card is determined during initiation. The Baseband chip 610 reads data from one of the subscriber identity cards 10 and 20, and writes data to one of the subscriber identity cards 10 and 20 via the dual-card controller 640. In addition, the dual-card controller 640 selectively transfers clocks, resets, and/or data signals to the subscriber identity cards 10 and 20 according to instructions issued by the Baseband chip 610. The Baseband chip 610 may support one or more of the GSM/GPRS/EDGE, WCDMA, CDMA 2000, WiMAX, TD-SCDMA, LTE, and TD-LTE technologies. The subscriber identity cards 10 and 20 may be any two of the Subscriber Identity Module (SIM) cards, Universal SIM (USIM) cards, Removable User Identity Module (R-UIM), and CDMA Subscriber Identity Module (CSIM) cards, which are corresponding to the wireless communications technologies supported by the Baseband chip 610. The MS 600 can therefore simultaneously camp on two cells provided by either the same network operator or different network operators for the plugged subscriber identity cards 10 and 20, and operate in stand-by mode using the single RF module 620 and the Baseband chip 610. Alternatively, FIG. 7 shows a block diagram illustrating the hardware architecture of an MS according to another embodiment of the invention. Similar to FIG. 2, the Baseband chip 710 performs baseband signaling processing, such as analog to ADC/DAC, gain adjusting, modulation/demodulation, encoding/decoding, and so on. However, the connections from the MS 700 to the subscriber identity cards 10 and 20 are independently handled by two interfaces (I/F) provided in the Baseband chip 710. It is to be understood that the hardware architecture as shown in FIG. 6 or 7 may be modified to include more than two subscriber identity cards, and the invention cannot be limited thereto.

Figure 8:
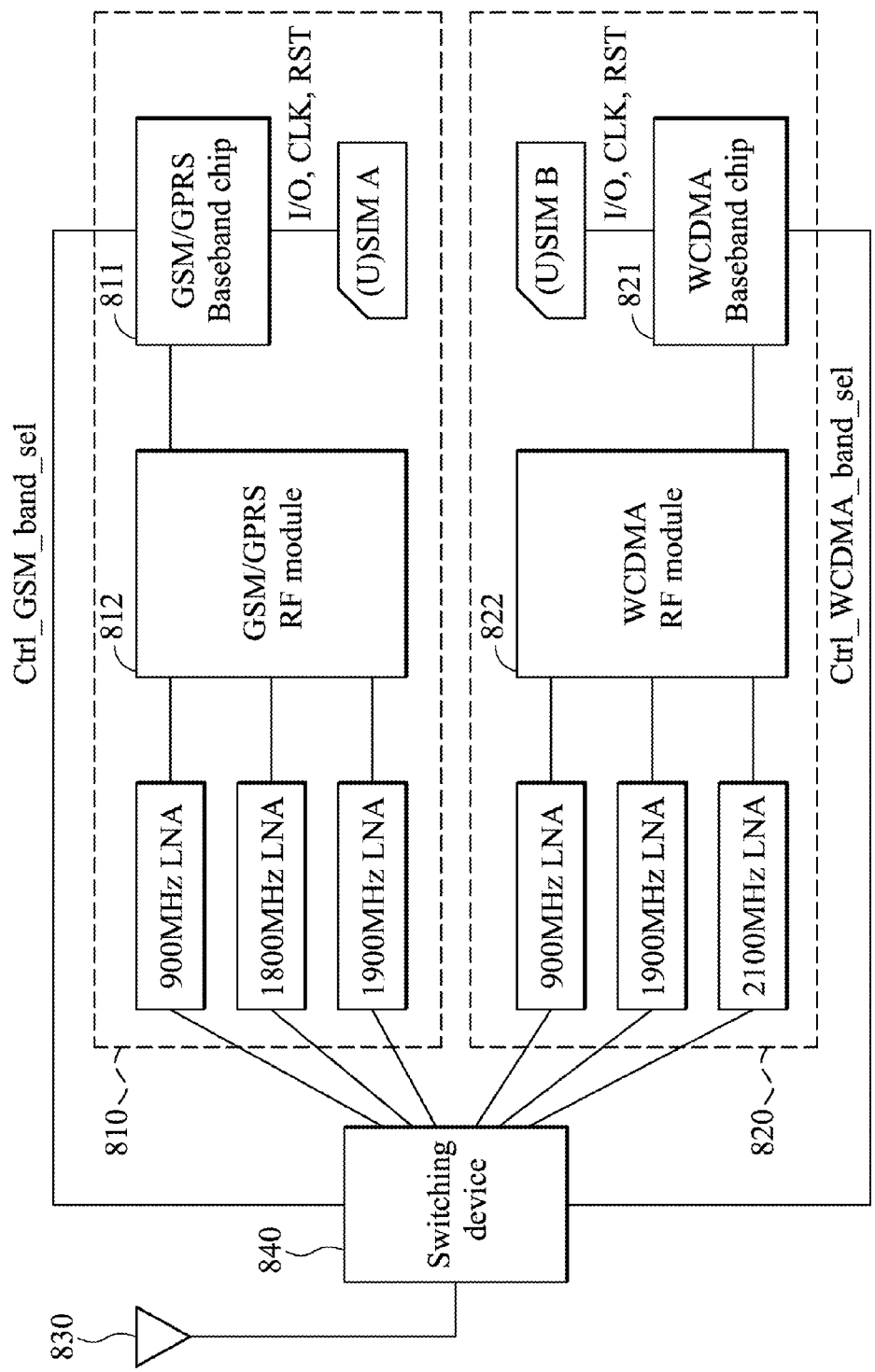
FIG. 8 is a block diagram illustrating the hardware architecture of an MS coupled with two subscriber identity cards and a single antenna according to an embodiment of the invention.

FIG. 8 is a block diagram illustrating the hardware architecture of an MS coupled with two subscriber identity cards and a single antenna according to an embodiment of the invention. The exemplary hardware architecture may be applied to any MS utilizing GSM/GPRS and WCDMA technologies. In the exemplary hardware architecture, two Radio Access Technology (RAT) modules 810 and 820 share a single antenna 830, and each RAT module contains at least an RF module and a Baseband chip, to camp on a cell and operate in stand-by mode, idle mode, or connected mode. As shown in FIG. 8, the GSM/GPRS Baseband chip 811 is coupled to a GSM/GPRS RF module 812, and the WCDMA Baseband chip 821 is coupled to a WCDMA RF module 822. In addition, when operating in a specific mode, each RAT module interacts with a specific subscriber identity card, such as (U)SIM A or B. A switching device 840 is coupled between the shared antenna 830 and multiple Low Noise Amplifiers (LNAs), and connects the antenna 830 to one LNA to allow the RF signals to pass through the connected LNA. Each LNA amplifies signals in a 2G/3G band received by the shared antenna 830 and provides the signals to a corresponding RF module, wherein the 2G/3G band may be a 900 MHz, 1800 MHz, 1900 MHz, or 2100 MHz band, or others. Once one of the Baseband modules attempts to perform a transceiving activity, such as a transmission (TX) or a reception (RX) activity, it issues a control signal Ctrl_GSM_band_sel or Ctrl_WCDMA_band_sel to direct the switching device 840 to connect the shared antenna 830 to a designated LNA. Note that the GSM/GPRS Baseband chip 811 and the WCDMA Baseband chip 821 are further connected for performing the coordination operations relating to the suspension/termination and resumption/restart of data transmission or reception as described above. It is to be understood that the GSM/GPRS module 810 and the WCDMA module 820 are given as examples. For those skilled in the art, it may be contemplated to use any two of the GSM/GPRS/EDGE, WCDMA, CDMA 2000, WiMAX, TD-SCDMA, LTE, TD-LTE, or others technologies, to implement the RAT modules 810 and 820 in the hardware architecture without departing from the spirit of the invention, and the invention cannot be limited thereto. It is to be understood that the hardware architecture as shown in FIG. 8 may be modified to include more than two subscriber identity cards, and the invention cannot be limited thereto.

A SIM card typically contains user account information, an international mobile subscriber identity (IMSI), and a set of SIM application toolkit (SAT) commands. In addition, storage space for phone book contacts is provided in SIM cards. A micro-processing unit (MCU) of a Baseband chip (referred to as a Baseband MCU hereinafter) may interact with the MCU of a SIM card (referred to as a SIM MCU hereinafter) to fetch data or SAT commands from the plugged SIM card. An MS is immediately programmed after plugging in the SIM card. SIM cards may also be programmed to display custom menus for personalized services. A SIM card may further store a Home Public-Land-Mobile-Network (HPLMN) code to indicate an associated network operator, wherein the HPLMN code contains a Mobile Country Code (MCC) followed by a Mobile Network code. To further clarify, an IMSI is a unique number associated with a global system for mobile communication (GSM) or a universal mobile telecommunications system (UMTS) network user. An IMSI may be sent by an MS to a GSM or UMTS network to acquire other detailed information of the network user in the Home Location Register (HLR) or to acquire the locally copied detailed information of the network user in the Visitor Location Register (VLR). Typically, an IMSI is 15 digits long or shorter (for example, the MTN South Africa's IMSIs are 14 digits long). The first 3 digits are the Mobile Country Code (MCC), and are followed by the Mobile Network Code (MNC), either 2 digits (European standard) or 3 digits (North American standard). The remaining digits are the mobile subscriber identification number (MSIN) for a GSM or UMTS network user.

A USIM card is inserted in an MS for UMTS (also called 3G) telephony communication. A USIM card stores user account information, IMSI, authentication information and a set of USIM Application Toolkit (USAT) commands, and provides storage space for text messages and phone book contacts. A USIM card may further store a Home Public-Land-Mobile-Network (HPLMN) code to indicate an associated network operator. A Baseband MCU may interact with an MCU of a USIM card (referred to as a USIM MCU hereinafter) to fetch data or USAT commands from the plugged USIM card. Note that the phone book on the USIM card has been greatly enhanced from that of the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in UMTS. An MS is immediately programmed after plugging in the USIM card. In addition, an R-UIM or CSIM card is developed for a CDMA MS that is equivalent to the GSM SIM and 3G USIM, except that it is capable of working in CDMA networks. The R-UIM or CSIM card is physically compatible with the GSM SIM card, and provides a similar security mechanism for CDMA networks and network users.

Figure 9:
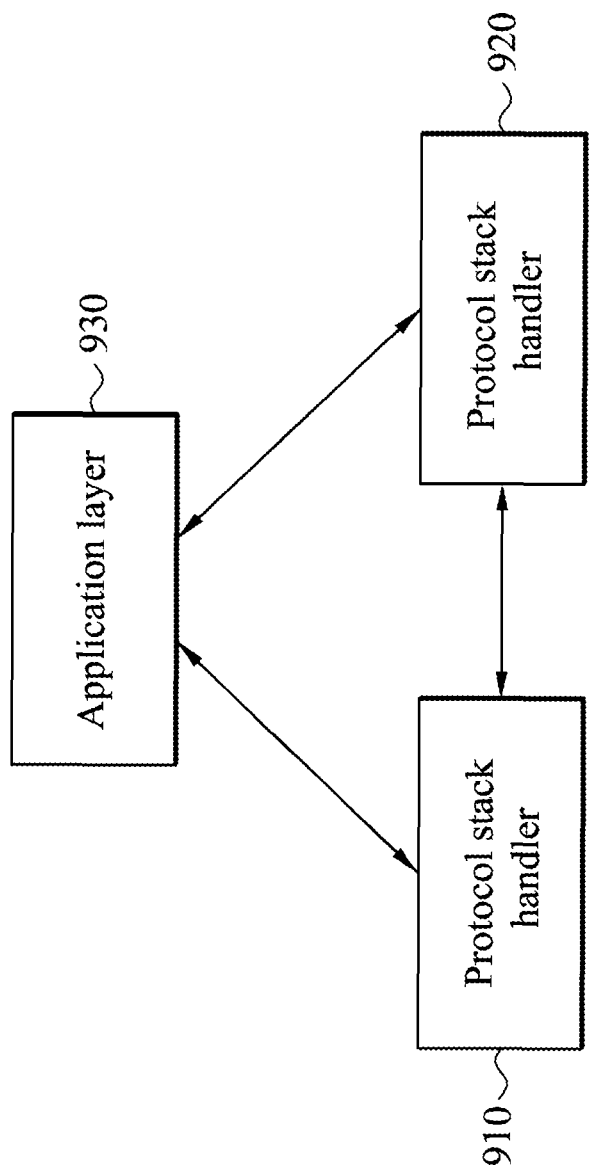
FIG. 9 is a block diagram illustrating the software architecture of an MS according to an embodiment of the invention.

FIG. 9 is a block diagram illustrating the software architecture of an MS according to an embodiment of the invention. The exemplary software architecture may contain protocol stack handlers 910 and 920, and an application layer 930. The protocol stack handler 910, when executed by a processing unit or a Baseband MCU, is configured to communicate with the service network 120 with a first subscriber identity card (e.g. the subscriber identity card 10), while the protocol stack handler 920, when executed by a processing unit or a Baseband MCU, is configured to communicate with the service network 130 with a second subscriber identity card (e.g. the subscriber identity card 20). The application layer 930 may contain program logics for providing Man-Machine Interface (MMI). The MMI is the means by which people interact with the MS, and the MMI may contain screen menus and icons, keyboard, shortcuts, command language, and online help, as well as physical input devices, such as buttons, touch screen, and keypad. By the input devices of the MMI, users may manually touch, press, click, or move the input devices to operate the MS for making or answering a phone call, texting, sending, or viewing short messages, multimedia messages, e-mails or instant messages, surfing the Internet, or others. Specifically, the application layer 930 may receive a user request for making an MO call with the first subscriber identity card, while the protocol stack handler 920 is performing a background packet-switched (PS) data service on-line, such as a push e-mail, an instant messaging (IM) service, or others, which is run in background and kept on-line with a corresponding server, with the second subscriber identity card. For the push e-mail service, e-mail messages that have been received by a server mail system may be transmitted automatically to the MS as data packets via a cellular network to keep mobile user up-to-date. The IM service is used for real-time text-based communications between two or more participants over the Internet, a cellular network, or the combination. Correspondingly, the application layer 930 may contain an e-mail client facilitating a user to edit, browse, or send e-mail messages, and/or an IM client facilitating a user to edit, browse, or send IM messages. When receiving the user request for MO call, the application layer 930 may request the protocol stack handler 910 to make the MO call with the first subscriber identity card. After that, the protocol stack handler 910 requests the protocol stack handler 920 to suspend or terminate the background PS data service. As soon as the background PS data service is suspended or terminated by the protocol stack handler 920, the protocol stack handler 910 continues to perform the MO call with the first subscriber identity card. Later, when the MO call is finished, the protocol stack handler 910 may inform the protocol stack handler 920 to resume or restart the background PS data service. In one embodiment, when the MO call is finished, the protocol stack handler 910 may check whether the background PS data service is suspended or terminated due to the made MO call. If so, the protocol stack handler 910 then informs the protocol stack handler 920 to resume or restart the background PS data service. For example, the protocol stack handler 910 may use a flag or marker to note the above condition, e.g. the default value of the flag or marker is set to "OFF", the value of the flag or marker is set to "ON" when the background PS data service is suspended or terminated for an MO call, and the value of the flag or marker is set to "OFF" when the MO call is finished.

Figure 10:
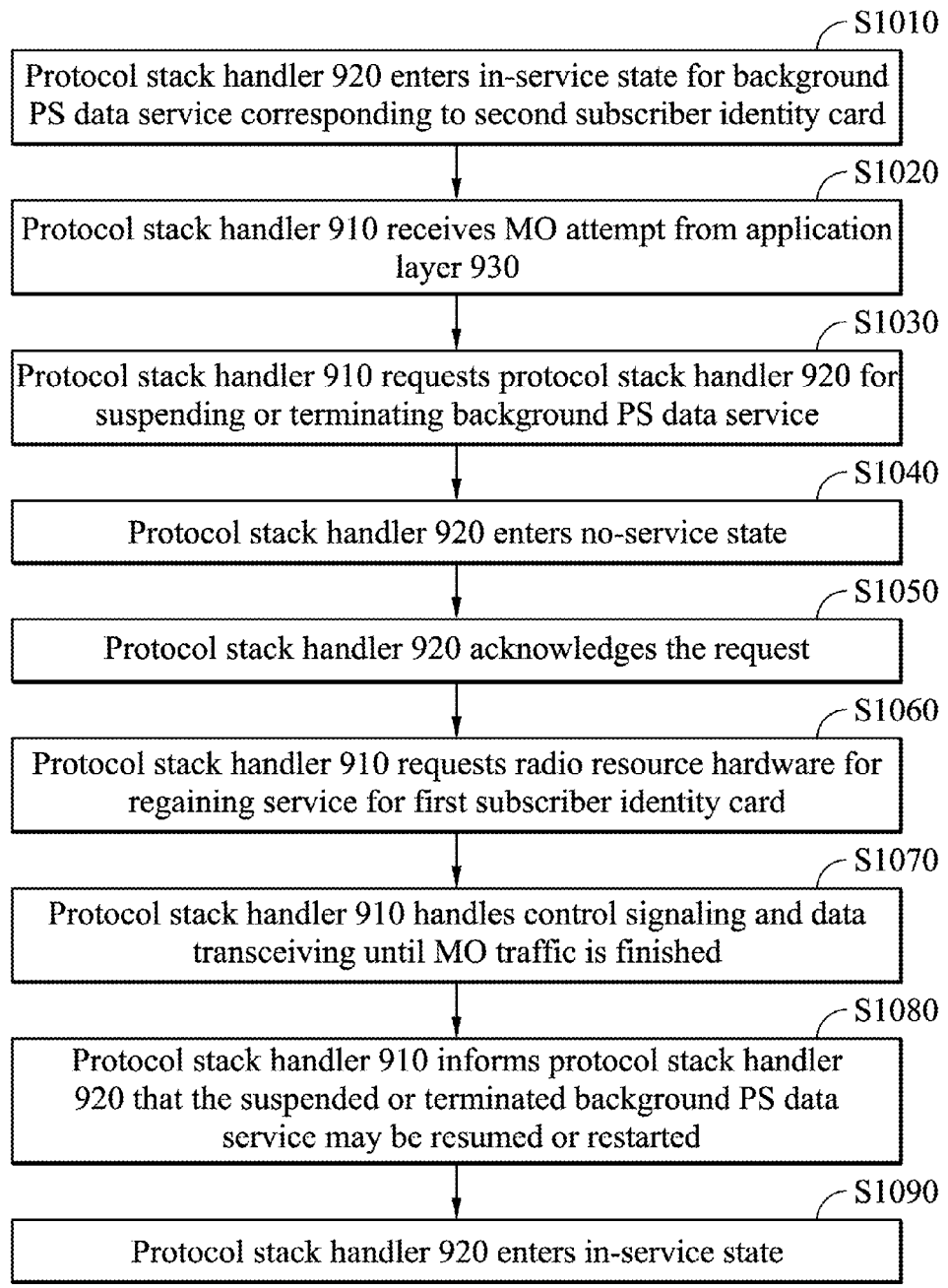
FIG. 10 is a flow chart illustrating an embodiment of the method for coordinating the operations between the protocol stack handlers 910 and 920 with respect to the software architecture shown in FIG. 9.

FIG. 10 is a flow chart illustrating an embodiment of the method for coordinating the operations between the protocol stack handlers 910 and 920 with respect to the software architecture shown in FIG. 9. Initially, the protocol stack handler 920 is in the in-service state where it occupies the single radio resource, such as a single antenna or single RF module, to support a background PS data service on-line, such as push e-mail, IM, or others, with the second subscriber identity card (step S1010). Next, the application layer 930 receives a user request for making an MO call, such as an MO voice or data call, or for transferring an MO short message or multimedia message, with the first subscriber identity card, and then issues an MO attempt to the protocol stack handler 910 (step S1020). The protocol stack handler 910 requests the protocol stack handler 920 to suspend or terminate the background PS data service corresponding to the second subscriber identity card in response to the user request (step S1030). In one embodiment, when receiving the user request, the application layer 930 may first determines whether an MO call has higher priority than a background PS data service. If so, the application layer 930 proceeds to issue an MO attempt to the protocol stack handler 910. In another embodiment, the service associated with the first subscriber identity card may be specified to have higher priority than the service associated with the second subscriber identity cards, or the other way around. For example, a subscriber identity card mainly used for CS services may have higher priority than another subscriber identity card mainly used for PS data services, or users may set one preferred subscriber identity card with a higher priority among a plurality of subscriber identity cards. In addition, the application layer 930 may further request user's permission once detecting that the background PS data service is kept on-line, and only request the protocol stack handler 910 for issuing an MO attempt if the permission is granted. Note that the protocol stack handler 920 may further informs the service network 130 that the background PS data service is being suspended or terminated, before suspending or terminating the background PS data service.

Subsequently, when receiving the request from the protocol stack handler 910, the protocol stack handler 920 suspends or terminates the background PS data service and then enters the no-service state (step S1040). Upon entering the no-service state, the protocol stack handler 920 further acknowledges the request from the protocol stack handler 910 (step S1050). To enter the no-service state, the protocol stack handler 920 may remove scheduled channel tasks, such as listening to PPCH, PCH or others, causing the MS to receive no packet paging messages from the camped on cell, and hinder any PRACH, RACH, PACCH, or similar uplink channel allocation for the second subscriber identity card. Alternatively, the protocol stack handler 920 may request the radio resource hardware, such as particular circuits of the Baseband chip to control the RF module, for suspending of the scheduled channel tasks, or for detaching the attached data service, such as GPRS. It is to be understood that, when the radio resource is occupied by the background PS data service for the second subscriber identity card, the protocol stack handler 910 no longer transceives data with the first subscriber identity card. Thus, after receiving the acknowledgement from the protocol stack handler 920, the protocol stack handler 910 requests the radio resource hardware for regaining service for the first subscriber identity card (step S1060).

One way to regain the service is that the protocol stack handler 910 may attempt to camp on the last serving cell before the start of the background PS data service. The last serving cell means the cell which had been camped on with the first subscriber identity card but been hanged because the single radio source is occupied for the background PS data service with the second subscriber identity card. The protocol stack handler 910 may read information regarding the last serving cell, which was recorded before the start of the background PS data service, and accordingly try to camp on it. Another way to regain the service is that the protocol stack handler 910 may find out a best cell in a pre-stored cell list, which was recorded before the start of the background PS data service, and attempt to camp on the found best cell, where the best cell means in which the measured signal has the best quality. If the last serving cell or all cells of the pre-stored cell list cannot be successfully camped on, the protocol stack handler 910 may direct the radio resource hardware to perform a Public Land Mobile Network (PLMN) search procedure to find out a suitable cell to be camped on. The PLMN search procedure for the WCDMA system is described below as an example. To begin, the WCDMA Baseband chip may instruct the WCDMA RF module to perform power scan to find out one or more cells with the better signal quality. Based on the power scan results, a cell search procedure may be performed for the cell with the best signal quality, containing steps of slot synchronization, frame synchronization and code-group identification, and scrambling-code identification. In the step of slot synchronization, the MS uses the primary synchronization code of synchronization Channel (SCH) to acquire slot synchronization to the cell. In the step of frame synchronization and code-group identification, the MS employs the secondary synchronization code of SCH to find frame synchronization and identify the code group of the cell found in the previous step. In the step of scrambling-code identification, the MS determines the exact primary scrambling code used by the cell. The primary scrambling code is typically identified through symbol-by-symbol correlation over the common pilot channel (CPICH) with all codes within the code group identified in the previous step. After the primary scrambling code is identified, the primary common control physical channel (CCPCH) may be detected and the cell-specific broadcast channel (BCH) information may be read. After completely collecting and storing information regarding the exact channel configuration and neighboring cells in memory or a storage device, the WCDMA module performs a location update procedure to inform the cellular network of its location. The PLMN search procedure for the GSM/GPRS system is described below as another example. The MS starts to perform power scan to find out proper cells to camp on. During power scan, the GSM/GPRS Baseband chip may instruct the GSM/GPRS RF module to perform signal level measurements on frequencies of the current network. After finding potential candidates based on the received signal level RXLREV (that is, completion of the power scan), each carrier is investigated by the GSM/GPRS Baseband chip for the presence of a frequency correction channel (FCCH), beginning with the strongest signal. A FCCH burst (FCB) is an all-zero sequence that produces a fixed tone enabling the GSM/GPRS RF module to lock its local oscillator to the base station clock. Its presence identifies the carrier as a BCCH carrier for synchronization. The MS then uses a synchronization burst (SB) of the synchronization channel (SCH) following the FCCH burst and having a long training sequence to fine tune the frequency correction and time synchronization. The GSM/GPRS Baseband chip obtains and stores the exact channel configuration of the selected cell from the BCCH data as well as the frequencies of the neighboring cells. After completely collecting and storing information regarding the exact channel configuration and neighboring cells in memory or a storage device, the GSM/GPRS module performs a location update procedure through a traffic channel (TCH) to inform the cellular network of its location.

Subsequent to step 1060, the protocol stack handler 910 handles control signaling and data transceiving for the MO call via the radio resource hardware until the MO traffic is finished (step S1070). The MO traffic may refer to a voice call as shown in FIG. 2, a short message transmission, a multimedia message transmission, or data packet transceiving (may be utilized to make a data call) as shown in FIG. 4. The MO traffic may be finished when the user gets off the phone via the MMI provided by the application layer 930, or when the MO short message or multimedia message is successfully transferred. Alternatively, the MO traffic may be finished when detecting that the corresponding node is busy or rejects the voice or data call, or when the transfer of the MO short message or multimedia message is failed. When the MO traffic is finished, the protocol stack handler 910 informs the protocol stack handler 920 that the suspended or terminated background PS data service may be resumed or restarted (step S1080). Then, the protocol stack handler 920 enters in-service state to resume or restart the suspended or terminated background PS data service (step S1090). To enter the in-service state, the protocol stack handler 920 may re-schedule channel tasks, such as such as listening to PPCH, PCH or others, causing the MS to receive packet paging messages and allow PRACH, RACH, PACCH, or similar channel allocation. Alternatively, the protocol stack handler 920 may request the radio resource hardware for resuming of the scheduled channel tasks, or for attaching data service, such as GPRS as shown in FIG. 3. It is to be understood that the suspended background PS data service may be resumed without any information loss when the suspending time period is shorter than a tolerable time. Or, during the suspending time period, no data is required to receive by the corresponding application, such as e-mail client, IM client, or others. Note that, in the resumption or restart of the background PS data service, the protocol stack handler 920 may need to regain the service of the radio resource hardware when the previously camped on cell is no longer available. Ways to regain the service may refer to that performed by the protocol stack handler 910 as stated above.

Figure 11:
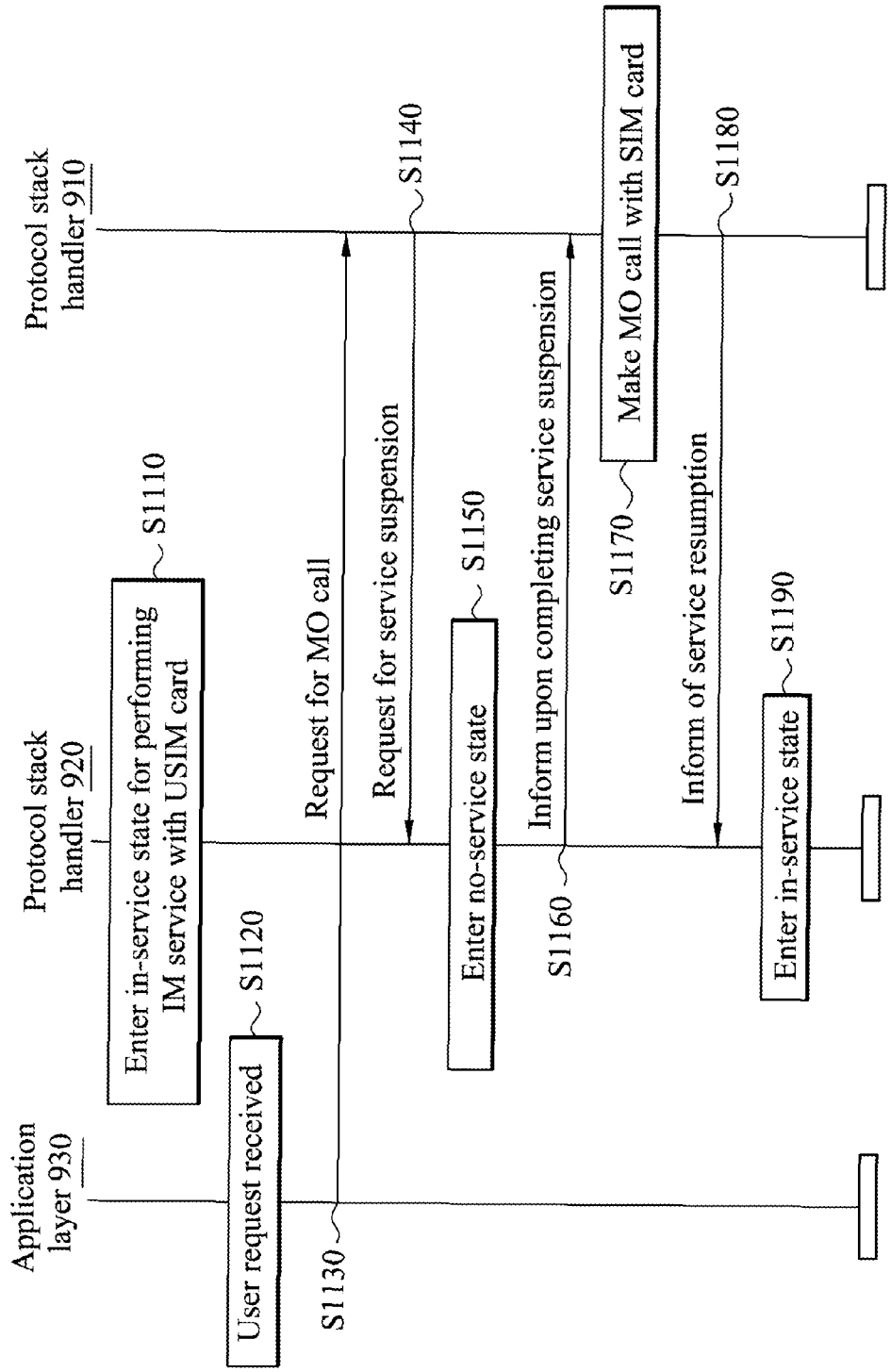
FIG. 11 is a message sequence chart illustrating the method for coordinating the operations between the protocol stack handlers 910 and 920 according to the embodiment of FIG. 10.

FIG. 11 is a message sequence chart illustrating the method for coordinating the operations between the protocol stack handlers 910 and 920 according to the embodiment of FIG. 10. In this embodiment, the protocol stack handler 920 corresponds to a USIM card conform to the WCDMA standard and initially configured to operate in the in-service state for performing an IM service with the service network 130 via a single radio resource (step S1110). Alternatively, the protocol stack handler 920 may support another background PS data service instead, such as the MMS service or push-email service. Or, the protocol stack handler 920 may support two or more background PS data services with the USIM card. Meanwhile, the application layer 930 receives a user request for making an MO call with a SIM card corresponding to the protocol stack handler 910 (step S1120). Then, the application layer 930 issues an MO attempt to the protocol stack handler 910 (step S1130). Assuming that the MO call has higher priority than the IM service, the protocol stack handler 910 requests the protocol stack handler 920 to suspend or terminate the IM service (step S1140). When receiving the request for service suspension or termination, the protocol stack handler 920 suspends or terminates the IM service, and then enters the no-service state (step S1150). As soon as the IM service is suspended or terminated, the radio resource is released and the protocol stack handler 920 informs the protocol stack handler 910 that the IM service has been suspended or terminated (step 1160). When being informed by the protocol stack handler 920, the protocol stack handler 910 proceeds to make the MO call with the SIM card (step S1170). After the MO traffic is finished, the protocol stack handler 910 informs the protocol stack handler 920 that the suspended or terminated IM service may be resumed or restarted (step S1180). Accordingly, the protocol stack handler 920 enters the in-service state to resume or restart the IM service when being informed by the protocol stack handler 910 (step S1190).

Figure 12:
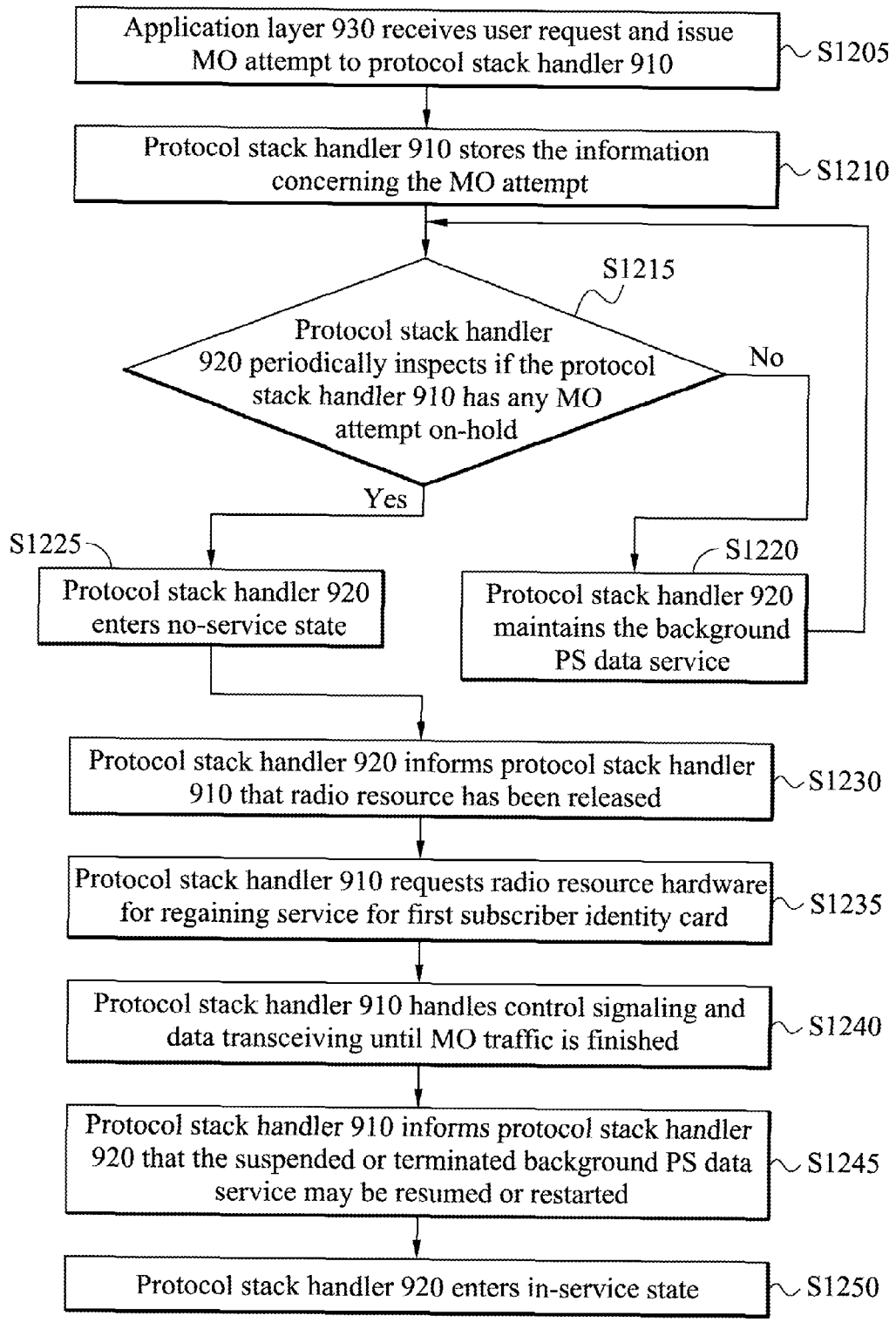
FIG. 12 is a flow chart illustrating another embodiment of the method for coordinating the operations between the protocol stack handlers 910 and 920 with respect to the software architecture shown in FIG. 9.

FIG. 12 is a flow chart illustrating another embodiment of the method for coordinating the operations between the protocol stack handlers 910 and 920 with respect to the software architecture shown in FIG. 9. Similar to the steps 1010 and 1020 in FIG. 10, the application layer 930 receives a user request for making an MO call with the first subscriber identity card and issues an MO attempt to the protocol stack handler 910, while the protocol stack handler 920 is in the in-service state for performing a background PS data service with the second subscriber identity card (step S1205). The protocol stack handler 910 stores the information concerning the MO attempt in a memory or storage device when receiving the MO attempt (step 1210). When in the in-service state for supporting the background PS data service, the protocol stack handler 920 periodically inspects if the protocol stack handler 910 has any MO attempt on-hold (step S1215). This may be achieved by checking whether the information concerning the MO attempt is present in the memory or storage device, or by polling the protocol stack handler 910. Subsequent to step S1215, if not, the protocol stack handler 920 maintains the background PS data service until the next check point (step S1220). If so, the protocol stack handler 920 suspends or terminates the background PS data service, and enters the no-service state (step S1225). Detailed description regarding the operations in the no-service state may refer to the above description relating to FIG. 10. After entering the no-service state, the protocol stack handler 920 informs the protocol stack handler 910 that the radio resource has been released (step S1230). Then, the protocol stack handler 910 requests the radio resource hardware for regaining service for the first subscriber identity card (step S1235), and handles control signaling and data transceiving until the MO traffic is finished (step S1240), as mentioned above in FIG. 10. When the MO traffic is finished, the protocol stack handler 910 informs the protocol stack handler 920 that the suspended or terminated background PS data service can be resumed or restarted (step S1245), enabling the protocol stack handler 920 to enter the in-service state (step S1250).

In another embodiment, instead of suspending or terminating the background PS data service, the coordination of operations between the protocol stack handlers 910 and 920 may be designed differently, such that the protocol stack handler 910 redirects the MO attempt to the protocol stack handler 920 when receiving the request from the application layer 930. Next, the protocol stack handler 920 makes the MO call with the second subscriber identity card. That is, the MO call is made using the network resources assigned by the service network 130 (connected with the protocol stack handler 920) instead of the service network 120 (connected with the protocol stack handler 910). Since the charges of the MO call will be billed to the second subscriber identity card instead of the first subscriber identity card, it may be preferred to advise the user before the redirection. For instance, the user may prefer to have the MO call made with the first subscriber identity card when the monthly rate configured for the first subscriber identity card has not yet been reached, or the user may prefer to make the MO call with the first subscriber identity card if the MO attempt relates to a voice call service and the first subscriber identity card provides voice call services with lower costs. Therefore, before redirecting the MO attempt to the protocol stack handler 920, the protocol stack handler 910 may request, via the application layer 930, permission from the user to do so, and the redirection of the MO attempt is only performed when the permission is granted.

Figure 13:
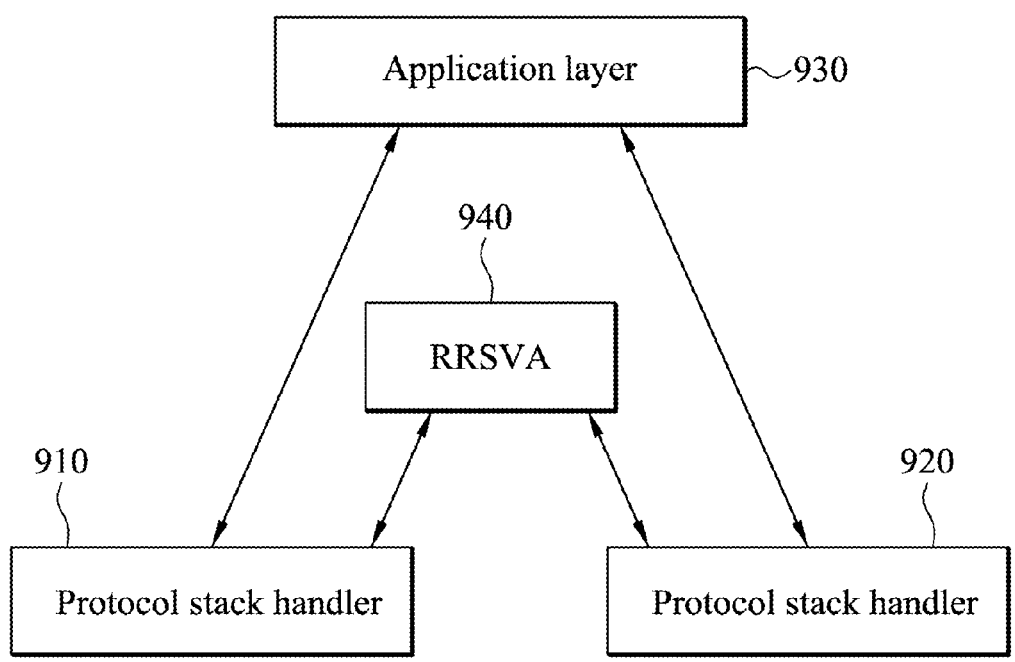
FIG. 13 is a block diagram illustrating the software architecture of an MS according to another embodiment of the invention.

FIG. 13 is a block diagram illustrating the software architecture of an MS according to another embodiment of the invention. Similar to FIG. 9, the exemplary software architecture also contains the protocol stack handlers 910 and 920, and the application layer 930. Additionally, a resource reservation arbitrator (RRSVA) 940 is included, which solves conflicts between the protocol stack handlers 910 and 920 and arbitrates which one of the protocol stack handlers 910 and 920 may occupy the radio resource hardware at a given time. The RRSVA 940 may be implemented in program code and, when the program code is loaded and executed by the processing unit or MCU, grants or rejects radio resource requests issued by any of the protocol stack handlers 910 and 920 in terms of predefined rules with the priorities of the requested traffics. For example, a CS service traffic, such as MO traffic, may have higher priority than a PS service traffic, such as traffic for push e-mail, IM, or others. Alternatively, the traffic requested by a specific protocol stack handler may be predefined to have higher priority than the traffic requested by other protocol stack handlers.

Figure 14:
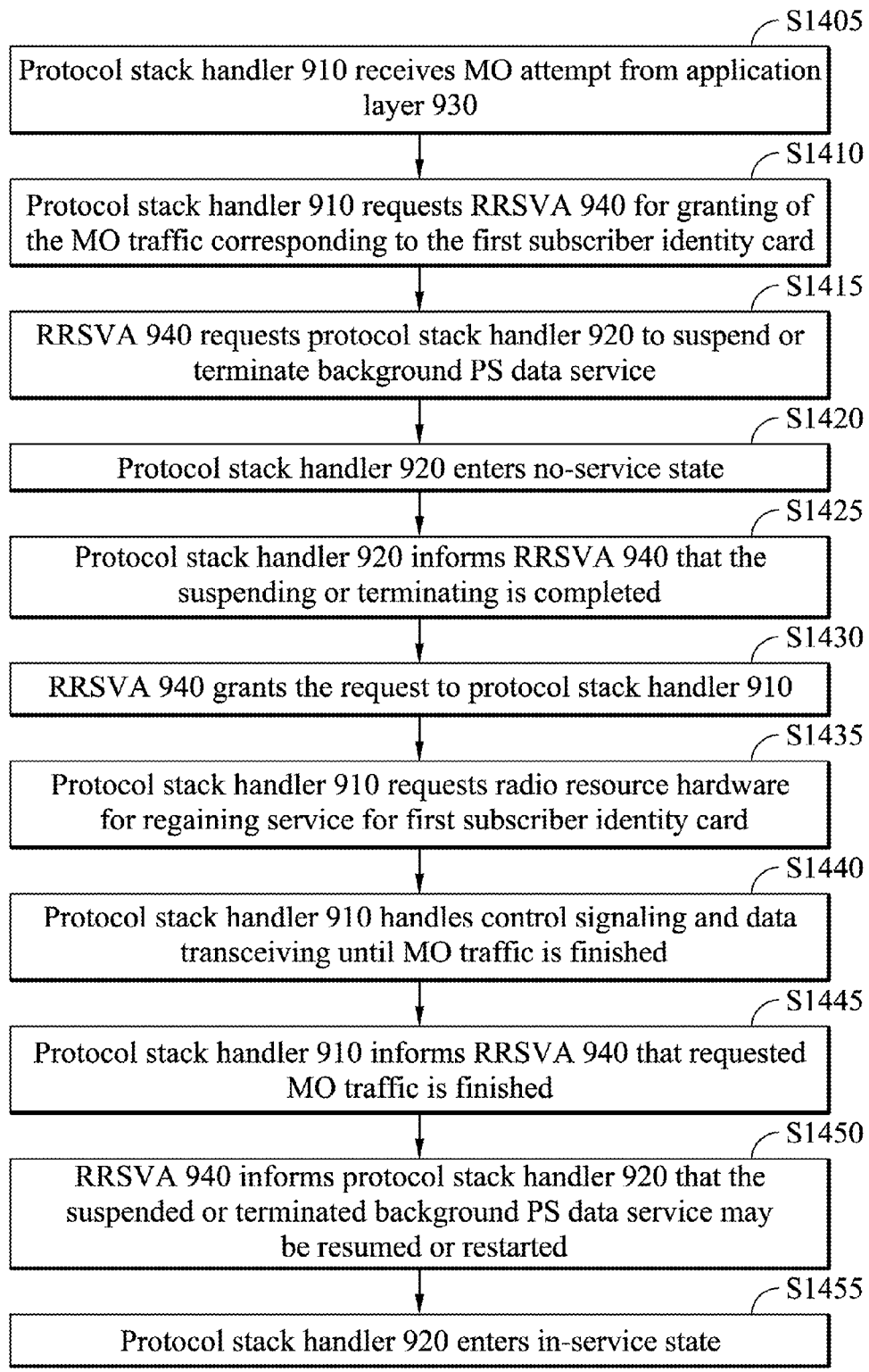
FIG. 14 is a flow chart illustrating an embodiment of the method for coordinating the operations between the protocol stack handlers 910 and 920 with respect to the software architecture shown in FIG. 13.

Accompanying with the software architecture of FIG. 13, a flow chart of a method for coordinating the operations between the protocol stack handlers 910 and 920 is illustrated in FIG. 14. Initially, the protocol stack handler 920 occupies the single radio resource to support the background PS data service on-line, such as push e-mail, IM, or others, with the second subscriber identity card, after receiving a grant from the RRSVA 940 for the forthcoming background PS data service. After granting the background PS data service request, the RRSVA 940 stores in a memory or storage device the information regarding that the radio resource hardware is occupied by the protocol stack handler 920 for the background PS data service. When the background PS data service is kept on-line, the application layer 930 may receive a user request for making an MO call, such as an MO voice or data call, or transfer an MO short or multimedia message with the first subscriber identity card, and then, issue an MO attempt to the protocol stack handler 910 (step 1405). After that, the protocol stack handler 910 requests the RRSVA 940 for granting of the MO traffic corresponding to the first subscriber identity card (step S1410). The RRSVA 940 then requests the protocol stack handler 920 to suspend or terminate of the background PS data service for the MO call has higher priority than the background PS data service in terms of a predefined rule (step S1415). After receiving the request from the RRSVA 940, the protocol stack handler 920 enters the no-service state (step S1420). Regarding the possible ways to enter the no-service state, reference may be made to the relevant description of FIG. 10. After successfully entering the no-service state, the protocol stack handler 920 informs the RRSVA 940 about the completion of the suspending or terminating of the background PS data service (step S1425). The RRSVA 940 stores in a memory or storage device the information regarding that the radio resource hardware is occupied by the protocol stack handler 910 for the MO call when being informed by the protocol stack handler 920, and then grants the request of the MO call from the protocol stack handler 910 (step S1430).

After receiving the grant, the protocol stack handler 910 requests the radio resource hardware for regaining service for the first subscriber identity card (step S1435). Details for regaining service, please refer to the relevant description of FIG. 10, and simply described herein for brevity. When the service is regained, the protocol stack handler 910 handles control signaling and data transceiving via the radio resource hardware, with the first subscriber identity card, until the MO traffic is finished (step S1440). The MO traffic may be a voice call as shown in FIG. 2, a short message transmission, a multimedia message transmission, or data packet transceiving (may be utilized to make a data call) as shown in FIG. 4. Ways of carrying out the MO traffic may refer to the relevant description of FIG. 10. When the MO traffic is finished, the protocol stack handler 910 informs the RRSVA 940 about the finish of the MO call (step S1445). The RRSVA 940 subsequently informs the protocol stack handler 920 that the suspended or terminated background PS data service can be resumed or restarted (step S1450). Accordingly, the protocol stack handler 920 enters the in-service state to resume or restart the suspended or terminated background PS data service (step S1455). Details for entering the in-service state may refer to the relevant description of FIG. 10, and simply described herein for brevity.

Figure 15:
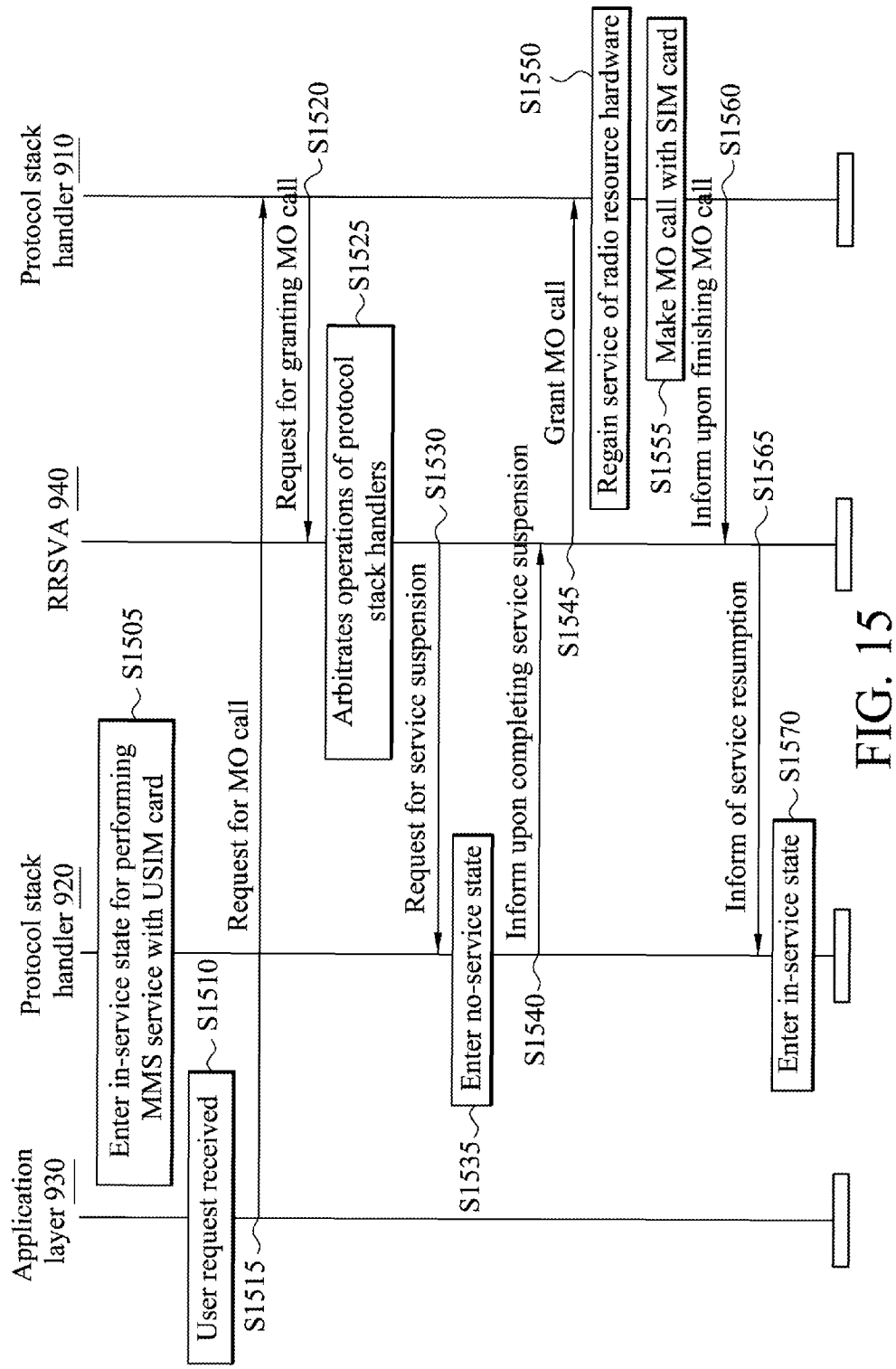
FIG. 15 is a message sequence chart illustrating the coordination of the operations between the protocol handlers 910 and 920 according to the embodiment of FIG. 14.

FIG. 15 is a message sequence chart illustrating the coordination of the operations between the protocol handlers 910 and 920 according to the embodiment of FIG. 14. In this embodiment, the protocol stack handler 920 corresponds to a USIM card conform to the WCDMA standard and performs a background PS data service with the service network 130 via the single radio resource with the USIM card (step S1505), while the protocol stack handler 910 corresponds to a SIM card conform to the GSM/GPRS standard and capable of communicating with the service network 120 with the SIM card. At first, the application layer 930 receives a user request for making an MO call with the SIM card (step S1510). In response to the user request, the application layer 930 issues an MO attempt to the protocol stack handler 910 (step S1515). When receiving the MO attempt from the application layer 930, the protocol stack handler 910 requests the RRSVA 940 for granting of the MO traffic corresponding to the SIM card (step S1520). The RRSVA 940 arbitrates which one of the protocol stack handlers 910 and 910 can occupy the single radio resource to perform the respective service traffic (step S1525). Assuming that the MO traffic has higher priority than the background PS data service traffic, the RRSVA 940 requests the protocol stack handler 920 to suspend or terminate the MMS service (step S1530). When receiving the request for service suspension or termination, the protocol stack handler 920 enters the no-service state in which the background PS data service is suspended or terminated (step S1535). That is, the single radio resource is released due to that the protocol stack handler 920 no longer occupies the single radio resource for the background PS data service. The protocol stack handler 920 informs the RRVSA 940 about the completion of the service suspension or termination (step 1540). Subsequently, the RRSVA 940 grants the request of the MO traffic issued by the protocol stack handler 910 (step S1545). After receiving the grant from RRSVA 940, the protocol stack handler 910 requests the radio resource hardware for regaining service for the first subscriber identity card (step S1550). After that, the protocol stack handler 910 handles control signaling and data transceiving via the radio resource hardware, with the SIM card, until the MO traffic is finished (step S1555). Later, when the MO traffic is finished, the protocol stack handler 910 informs the RRSVA 940 that the requested MO traffic is finish (step S1560). When being informed about the MO traffic being finished, the RRSVA 940 determines that the MMS service has been previously suspended or terminated due to the MO traffic and therefore, informs the protocol stack handler 920 that the suspended or terminated background PS data service can be resumed or restarted (step S1565). Accordingly, the protocol stack handler 920 enters the in-service state to resume or restart the suspended or terminated background PS data service (step S1570).

Figure 16:
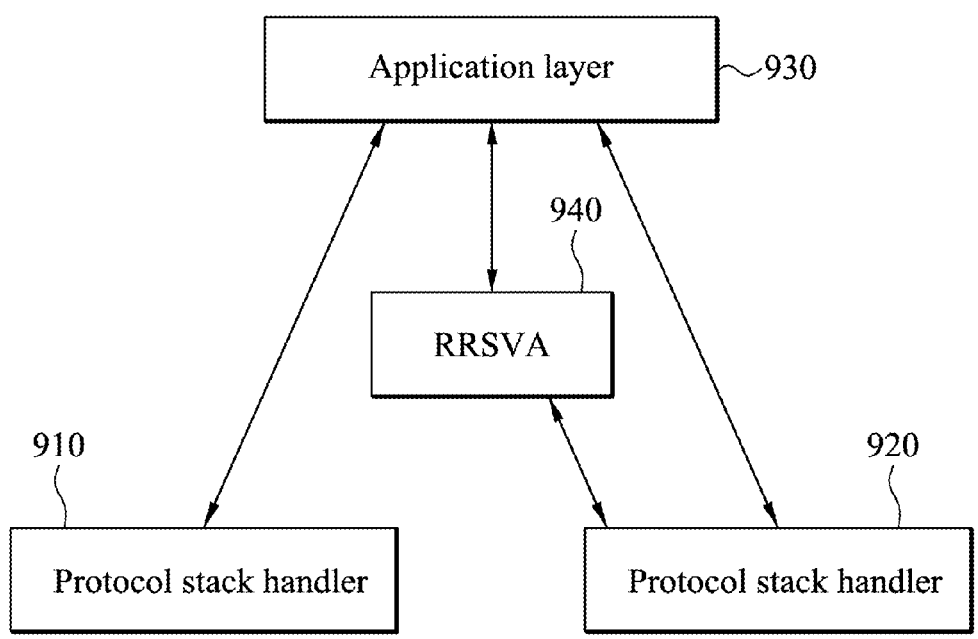
FIG. 16 is a block diagram illustrating the software architecture of an MS according to yet another embodiment of the invention.
Figure 17:
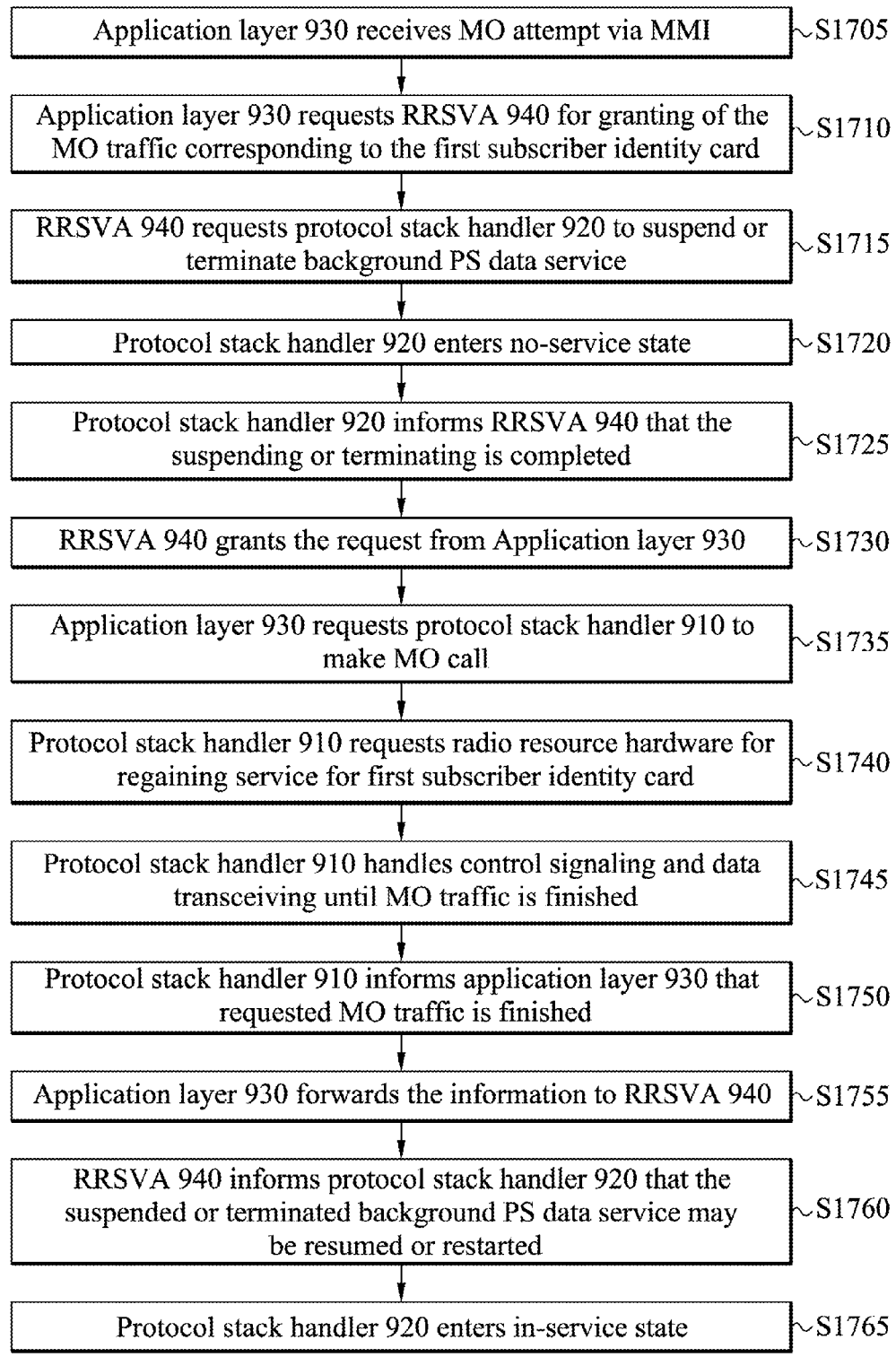
FIG. 17 is a flow chart illustrating an embodiment of the method for coordinating the operations between the protocol stack handlers 910 and 920 with respect to the software architecture shown in FIG. 16.

FIG. 16 is a block diagram illustrating the software architecture of an MS according to yet another embodiment of the invention. Similar to FIG. 12, the exemplary software architecture also contains the protocol stack handlers 910 and 920, the application layer 930, and the RRSVA 940. However, the application layer 930 coordinates the operations between the RRSVA 940 and the protocol stack handlers 910 and 920 to complete the MO call requested by users. Accompanying with the software architecture of FIG. 16, a flow chart of a method for coordinating the operations between the protocol stack handlers 910 and 920 is illustrated in FIG. 17. When the background PS data service is kept on-line, the application layer 930 receives via the MMI a user request for making an MO call, such as an MO voice or data call, or transfer an MO short or multimedia message with the first subscriber identity card (step S1705), and then, requests the RRSVA 940 for granting of the MO traffic corresponding to the first subscriber identity card (step S1710). The RRSVA 940 then requests the protocol stack handler 920 to suspend or terminate of the background PS data service (step S1715). After receiving the request from the RRSVA 940, the protocol stack handler 920 enters the no-service state (step S1720). Regarding the ways to enter the no-service state, reference may be made to the relevant description of FIG. 10. After successfully entering the no-service state, the protocol stack handler 920 informs the RRSVA 940 about the completion of the suspending or terminating of the background PS data service (step S1725). Note that the RRSVA 940 maintains information indicating which protocol stack handler currently occupies the single radio resource for a particular purpose, as discussed above. Specifically, the RRSVA 940 stores in a memory or storage device the information regarding that the radio resource hardware is occupied by the protocol stack handler 910 for the MO call when being informed by the protocol stack handler 920, and then grants the request of the MO call from the application layer 930 (step S1730).

After the RRSVA 940 grants the request, the application layer 930 requests the protocol stack handler 910 for making the MO call (step S1735). Note that, the application layer 930 may further find out currently executed client applications, such as e-mail client, IM client or others, and close them from use. After that, as discussed above, the protocol stack handler 910 requests the radio resource hardware for regaining service for the first subscriber identity card (step S1740), and then controls signaling and data transceiving via the radio resource hardware until the MO traffic is finished (step S1745). After receiving a notification indicating that the requested MO traffic is finished from the protocol stack handler 910 (step S1750), the application layer 930 forwards the notification to the RRSVA 940 (step S1755), enabling the RRSVA 940 to inform the protocol stack handler 920 that the suspended or terminated background PS data service may be resumed or restarted (step S1760). Accordingly, as discussed above, the protocol stack handler 920 enters the in-service state to resume or restart the suspended or terminated background PS data service (step S1765). Also, the RRSVA 940 may modify the maintained information correspondingly. The application layer 930 may further restarts the client applications which were closed to bring the background PS data service back to on-line if required.

FIG. 18 is a message sequence chart illustrating the coordination of the operations between the protocol handlers 910 and 920 according to the embodiment of FIG. 17. In this embodiment, the protocol stack handler 920 corresponds to a USIM card conform to the WCDMA standard and performs an background PS data service with the service network 130 via the single radio resource with the USIM card (step S1805), while the protocol stack handler 910 corresponds to a SIM card conform to the GSM/GPRS standard and capable of communicating with the service network 120 with the SIM card. At first, the application layer 930 receives via the MMI a user request for making an MO call with the SIM card (step S1810). In response to the user request, the application layer 930 requests the RRSVA 940 for granting of the MO traffic corresponding to the first subscriber identity card (step S1815). Subsequently, the RRSVA 940 arbitrates which one of the protocol stack handlers 910 and 910 can occupy the single radio resource to perform the respective service traffic (step S1820). Assuming that the MO traffic has higher priority than the background PS data service traffic, the RRSVA 940 requests the protocol stack handler 920 to suspend or terminate the background PS data service (step S1825). When receiving the request for service suspension or termination, the protocol stack handler 920 enters the no-service state in which the background PS data service is suspended or terminated (step S1830). That is, the single radio resource is released due to that the protocol stack handler 920 no longer occupies the single radio resource for the background PS data service. Then, the protocol stack handler 920 informs the RRVSA 940 about the completion of the service suspension or termination (step S1835). After that, the RRSVA 940 grants the request of the MO traffic issued by the application layer 930 (step S1840). After receiving the grant from RRSVA 940, the application layer 930 requests the protocol stack handler 910 for making the MO call (step S1845). The protocol stack handler 910 requests the radio resource hardware for regaining service for the first subscriber identity card (step S1850). With the service regained, the protocol stack handler 910 handles control signaling and data transceiving via the radio resource hardware, with the SIM card, until the MO traffic is finished (step S1855). Later, when the MO traffic is finished, the protocol stack handler 910 informs the application layer 930 that the requested MO traffic is finish (step S1860), and the application layer 930 forwards the information to the RRSVA 940 (step S1865). When informed about the MO traffic being finished, the RRSVA 940 determines that the background PS data service has been previously suspended or terminated due to the MO traffic and therefore, informs the protocol stack handler 920 that the suspended or terminated background PS data service can be resumed or restarted (step S1870). Accordingly, the protocol stack handler 920 enters the in-service state to resume or restart the suspended or terminated background PS data service (step S1875).

In another embodiment, in the methods of FIG. 14 and FIG. 17, the RRSVA 940 may redirect the MO attempt to the protocol stack handler 920 instead of the protocol stack handler 910 when receiving the request for granting of the MO traffic. Since the charges of the MO call will be billed to the second subscriber identity card instead of the first subscriber identity card, it may be preferred to advise the user before the redirection. For instance, the user may prefer to have the MO call made with the first subscriber identity card when the monthly rate configured for the first subscriber identity card has not yet been reached, or the user may prefer to perform the MO call with the first subscriber identity card if the MO call relates to a voice call service and the first subscriber identity card provides voice call services with lower costs. Therefore, before redirecting the MO call to the protocol stack handler 920, the RRSVA 940 may request, via the application layer 930, permission from the user to do so, and the redirection of the MO call is only performed when the permission is granted.

While the invention has been described by way of example and in terms of preferred embodiment, it is to be understood that the invention is not limited thereto. Those who are skilled in this technology can still make various alterations and modifications without departing from the scope and spirit of this invention. For example, the software architectures of FIGS. 9, 16, and 13 may each be implemented in program code stored in a machine-readable storage medium, such as a magnetic tape, semiconductor, magnetic disk, optical disc (e.g., CD-ROM, DVD-ROM, etc.), or others. A Web server may store the software architectures of FIGS. 9, 16, and 13 in a machine-readable storage medium, which can be downloaded by a client computer through the Internet. When loaded and executed by the processing unit or MCU, the program code may perform the methods of FIGS. 10 and 12, 14, or 17, respectively corresponding to the software architectures of FIGS. 9, 16, and 13. Although the embodiments described above employ the GSM/GPRS and WCDMA based technologies, the invention is not limited thereto. The embodiments may also be applied to other cellular network technologies, such as CDMA 2000, and TD-SCDMA, WiMAX, LTE, and TD-LTE technologies. Therefore, the scope of the present invention shall be defined and protected by the following claims and their equivalents.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A wireless communications device, comprising:
a single radio frequency (RF) module; and
a baseband chip configured to initiate a mobile originated (MO) call through the single RF module with a first subscriber identity card when the single RF module is occupied by performing a packet switched (PS) data service with a second subscriber identity card, arbitrate a first protocol stack handler to suspend or terminate the PS data service associated with the second subscriber identity card in response to initiating the MO call associated with the first subscriber identity card, and arbitrate a second protocol stack handler to make the MO call associated with the first subscriber identity card when the PS data service associated with the second subscriber identity card is suspended or terminated,
wherein the baseband chip further determines whether the MO call has a higher priority than the PS data service and the arbitration of the first protocol stack handler to suspend or terminate the PS data service is performed when the MO call has a higher priority than the PS data service.

2. The wireless communications device of claim 1, wherein the baseband chip further arbitrates the first protocol stack handler to resume or restart the PS data service associated with the second subscriber identity card when the MO call is finished.

3. The wireless communications device of claim 2, wherein the baseband chip further arbitrates the first protocol stack handler to regain service for the second subscriber identity card subsequent to the finishing of the MO call and prior to the resuming or restarting of the PS data service.

4. The wireless communications device of claim 2, wherein the baseband chip further arbitrates the first protocol stack handler to inform a service network associated with the PS data service about the suspension or termination of the PS data service, prior to suspending or terminating the PS data service, and to inform the service network about the resumption or restart of the PS data service prior to resuming or restarting the PS data service.

5. The wireless communications device of claim 1, wherein the baseband chip further requests permission to a user via a man-machine interface (MMI) to suspend or terminate the PS data service, and the arbitration of the first protocol stack handler to suspend or terminate PS data service is performed when the permission is granted by the user via the MMI.

6. The wireless communications device of claim 1, wherein the baseband chip further arbitrates the second protocol stack handler to regain service for the first subscriber identity card subsequent to the arbitrating the first protocol stack handler to suspend or terminate the PS data service and prior to arbitrating the second protocol stack handler to make the MO call.

7. The wireless communications device of claim 1, wherein the baseband chip further arbitrates the second protocol stack handler to camp on the last serving cell based on information, which was recorded before start of the PS data service, to regain service for the first subscriber identity card.

8. The wireless communications device of claim 1, wherein the baseband chip further arbitrates the second protocol stack handler to find out a best cell from a cell list, which was recorded before start of the PS data service, and camp on the found best cell to regain service for the first subscriber identity card.

9. The wireless communications device of claim 1, wherein the baseband chip further arbitrates the second protocol stack handler to perform a Public Land Mobile Network search procedure to camp on a suitable cell to regain service for the first subscriber identity card.

10. The wireless communications device of claim 1, wherein the PS data service is a push e-mail or an instant messaging service, which is run in background and kept on-line with a corresponding server.

11. The wireless communications device of claim 1, wherein the baseband chip further arbitrates the first protocol stack handler to suspend or remove scheduled channel tasks for suspending or terminating the PS data service, causing to receive no packet paging messages with the second subscriber identity card, and to hinder uplink channel allocation for the second subscriber identity card.

12. The wireless communications device of claim 1, wherein the baseband chip further arbitrates the first protocol stack handler to detach an attached data service for suspending or terminating the PS data service.

13. A method for coordinating operations between circuit switched (CS) and packet switched (PS) services with different subscriber identity cards in a wireless communications device comprising a single RF module, the method comprising:
  initiating a Mobile Originated (MO) call through the single RF module from the wireless communications device with a first subscriber identity card when the single RF module is occupied by performing a PS data service with a second subscriber identity card;
  determining whether the MO call has a higher priority than the PS data service;
  arbitrating a first protocol stack handler to suspend or terminate the PS data service associated with the second subscriber identity card in response to initiating the MO call associated with the first subscriber identity card when the MO call has a higher priority than the PS data service; and
  arbitrating a second protocol stack handler to make the MO call associated with the first subscriber identity card when the PS data service associated with the second subscriber identity card is suspended or terminated.

14. The method of claim 13, further comprising arbitrating the second protocol stack handler to regain service for the first subscriber identity card subsequent to arbitrating the first protocol stack handler to suspend or terminate the PS data service and prior to arbitrating the second protocol stack handler to make the MO call.

15. The method of claim 14, wherein the regaining step further comprises:
  finding out a best cell from a cell list, which was recorded before start of the PS data service; and
  camping on the found best cell to regain service.

16. The method of claim 14, wherein the regaining step further comprises performing a Public Land Mobile Network search procedure to camp on a suitable cell to regain service.

17. The method of claim 14, further comprising requesting permission to a user to suspend or terminate the PS data service before arbitrating the first protocol stack handler for the suspending or terminating step, wherein the arbitration of the first protocol stack handler for the suspending or terminating step is performed when the permission is granted.

18. A non-transitory machine-readable storage medium comprising program code, which, when executed, causes a wireless communications device to perform a method for coordinating operations between circuit switched (CS) and packet switched (PS) services with different subscriber identity cards in a wireless communications device comprising a single RF module, the method comprising:
  initiating a Mobile Originated (MO) call through the single RF module from the wireless communications device with a first subscriber identity card when the single RF module is occupied by performing a PS data service with a second subscriber identity card;
  determining whether the MO call has a higher priority than the PS data service;
  arbitrating a first protocol stack handler to suspend or terminate the PS data service associated with the second subscriber identity card in response to initiating the MO call associated with the first subscriber identity card when the MO call has a higher priority than the PS data service; and
  arbitrating a second protocol stack handler to make the MO call associated with the first subscriber identity card when the PS data service associated with the second subscriber identity card is suspended or terminated.

19. A wireless communications device, comprising:
  a single radio frequency (RF) module; and
  a baseband chip configured to initiate a mobile originated (MO) call through the single RF module from the wireless communications device with a first subscriber identity card when the single RF module is occupied by performing a packet switched (PS) data service with a second subscriber identity card, redirect the MO call to the second subscriber identity card, and make the MO call with the second subscriber identity card;
  wherein the baseband chip further determines whether the MO call has a higher priority than the PS data service and the redirection of the MO call to the second subscriber identity card is performed when the MO call has a higher priority than the PS data service.

20. The wireless communications device of claim 19, wherein the baseband chip is further configured to request a permission to a user to redirect the MO call to the second subscriber identity card, and make the MO call with the second subscriber identity card when the permission is granted by the user.

* * * * *